US008905848B2

(12) United States Patent
Umaki et al.

(10) Patent No.: US 8,905,848 B2
(45) Date of Patent: Dec. 9, 2014

(54) SERVER SYSTEM, GAME DEVICE, CONTROL METHOD, PROGRAM, AND INFORMATION STORAGE MEDIUM

(75) Inventors: Takashi Umaki, Saitama (JP); Yoshitaka Watanabe, Yokohama (JP); Yukio Ooba, Sagamihara (JP); Shigeo Hashimoto, Yokohama (JP); Tadashi Hiraoka, Yokohama (JP)

(73) Assignee: Bandai Namco Games Inc., Tokyo (JP)

( * ) Notice: Subject to any disclaimer, the term of this patent is extended or adjusted under 35 U.S.C. 154(b) by 1245 days.

(21) Appl. No.: 12/780,425

(22) Filed: May 14, 2010

(65) Prior Publication Data

US 2010/0227693 A1 Sep. 9, 2010

Related U.S. Application Data

(63) Continuation of application No. PCT/JP2008/070572, filed on Nov. 12, 2008.

(30) Foreign Application Priority Data

Nov. 16, 2007 (JP) ................................ 2007-298130

(51) Int. Cl.
*A63F 13/00* (2014.01)
*A63F 13/30* (2014.01)
*G07F 17/32* (2006.01)

(52) U.S. Cl.
CPC ............ *A63F 13/12* (2013.01); *A63F 2300/554* (2013.01); *A63F 2300/636* (2013.01); *A63F 2300/208* (2013.01); *A63F 2300/513* (2013.01); *G07F 17/3234* (2013.01); *G07F 17/32* (2013.01); *A63F 2300/407* (2013.01); *G07F 17/3232* (2013.01); *A63F 2300/5546* (2013.01); *G07F 17/3225* (2013.01); *A63F 2300/5513* (2013.01); *G07F 17/323* (2013.01)

USPC .................. 463/42; 463/24; 463/25; 463/29; 463/43

(58) Field of Classification Search
CPC ... G07F 17/32; G07F 17/3225; G07F 17/323; G07F 17/3232; G07F 17/3234
USPC .............................. 463/25, 26, 24, 29, 42, 43
See application file for complete search history.

(56) References Cited

U.S. PATENT DOCUMENTS 4,858,930 A * 8/1989 Sato ................................ 463/23
5,583,995 A * 12/1996 Gardner et al. ............... 709/219

(Continued)

FOREIGN PATENT DOCUMENTS

| JP | A-2001-292255 | 10/2001 |
| JP | A-2001-325455 | 11/2001 |

(Continued)

OTHER PUBLICATIONS

International Search Report issued in International Application No. PCT/JP2008/070572 on Feb. 10, 2009 (with English-language translation).

(Continued)

*Primary Examiner* — William H McCulloch, Jr.
(74) *Attorney, Agent, or Firm* — Oliff PLC

(57) ABSTRACT

A server system that is communicably connected to a game device that is installed in a game operating entity includes a game data storage section, a read section that reads user data about a player, a transmission section that transmits the user data to the game device before the player starts playing the game, a reception section that receives game result data from the game device after the player has finished playing the game, a write section that writes the game result data into the game data storage section, and a charging section that performs a charging process that charges the game operating entity for at least one of a load process and a save process, the load process reading the user data and transmitting the user data to the game device, and the save process receiving the game result data from the game device and writing the game result data into the game data storage section.

31 Claims, 26 Drawing Sheets

(56) References Cited

U.S. PATENT DOCUMENTS

| | | | |
|---|---|---|---|
| 5,816,917 A * | 10/1998 | Kelmer et al. | 463/16 |
| 6,336,861 B1 * | 1/2002 | Konoe et al. | 463/23 |
| 6,425,825 B1 * | 7/2002 | Sitrick | 463/31 |
| 6,460,076 B1 * | 10/2002 | Srinivasan | 709/219 |
| 6,510,502 B1 * | 1/2003 | Shimizu | 711/164 |
| 7,470,196 B1 * | 12/2008 | Joshi | 463/42 |
| 7,515,718 B2 * | 4/2009 | Nguyen et al. | 380/278 |
| 7,555,126 B2 * | 6/2009 | Okada et al. | 380/251 |
| 7,743,163 B2 * | 6/2010 | Ruppert | 709/232 |
| 7,930,345 B2 * | 4/2011 | Dhupelia et al. | 709/203 |
| 8,029,366 B2 * | 10/2011 | Fujimoto | 463/42 |
| 8,052,532 B2 * | 11/2011 | Umaki et al. | 463/42 |
| 8,152,628 B2 * | 4/2012 | Kinsley et al. | 463/25 |
| 8,535,159 B2 * | 9/2013 | Umaki et al. | 463/42 |
| 2002/0085720 A1 * | 7/2002 | Okada et al. | 380/251 |
| 2002/0183112 A1 * | 12/2002 | Emmerson et al. | 463/41 |
| 2003/0073494 A1 * | 4/2003 | Kalpakian et al. | 463/42 |
| 2003/0110242 A1 * | 6/2003 | Brown et al. | 709/222 |
| 2003/0187742 A1 * | 10/2003 | Yamagishi | 705/18 |
| 2003/0233281 A1 * | 12/2003 | Takeuchi et al. | 705/26 |
| 2004/0166918 A1 * | 8/2004 | Walker et al. | 463/16 |
| 2005/0064926 A1 * | 3/2005 | Walker et al. | 463/16 |
| 2005/0179685 A1 * | 8/2005 | Kake et al. | 345/419 |
| 2005/0182715 A1 * | 8/2005 | Kawahara | 705/39 |
| 2005/0192099 A1 * | 9/2005 | Nguyen et al. | 463/42 |
| 2006/0035696 A1 * | 2/2006 | Walker et al. | 463/16 |
| 2006/0168119 A1 * | 7/2006 | Inoue et al. | 709/218 |
| 2006/0247016 A1 * | 11/2006 | Walker et al. | 463/20 |
| 2007/0082739 A1 * | 4/2007 | Tsubota | 463/42 |
| 2007/0088665 A1 | 4/2007 | Sakoh et al. | |
| 2007/0099694 A1 * | 5/2007 | McCarthy et al. | 463/24 |
| 2007/0111778 A1 * | 5/2007 | Walker et al. | 463/16 |
| 2007/0232392 A1 * | 10/2007 | Pace | 463/29 |
| 2008/0000750 A1 | 1/2008 | Ueda et al. | |
| 2008/0182651 A1 * | 7/2008 | Marshall et al. | 463/25 |
| 2008/0242389 A1 * | 10/2008 | Jackson | 463/13 |
| 2009/0124344 A1 * | 5/2009 | Mitchell et al. | 463/20 |
| 2009/0124369 A1 * | 5/2009 | Mitchell et al. | 463/27 |
| 2009/0124375 A1 * | 5/2009 | Patel | 463/29 |
| 2009/0209334 A1 * | 8/2009 | Umaki et al. | 463/29 |
| 2009/0209351 A1 * | 8/2009 | Umaki et al. | 463/42 |
| 2009/0276516 A1 * | 11/2009 | Ruppert | 709/224 |
| 2010/0227693 A1 * | 9/2010 | Umaki et al. | 463/42 |

FOREIGN PATENT DOCUMENTS

| | | |
|---|---|---|
| JP | A-2002-102541 | 4/2002 |
| JP | A-2002-210226 | 7/2002 |
| JP | A-2003-79956 | 3/2003 |
| JP | A-2003-150808 | 5/2003 |
| JP | A-2003-190590 | 7/2003 |
| JP | B2-3449369 | 9/2003 |
| JP | A-2006-350518 | 12/2006 |
| JP | A-2007-268237 | 10/2007 |
| WO | WO 2005/033954 A1 | 4/2005 |

OTHER PUBLICATIONS

Sep. 3, 2012 Extended European Search Report issued in European Patent Application No. 08850941.9.

* cited by examiner

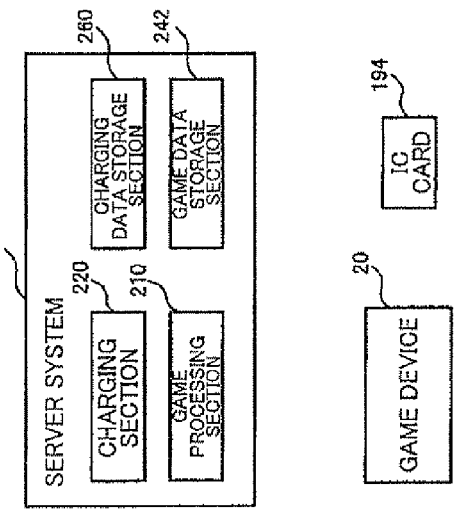
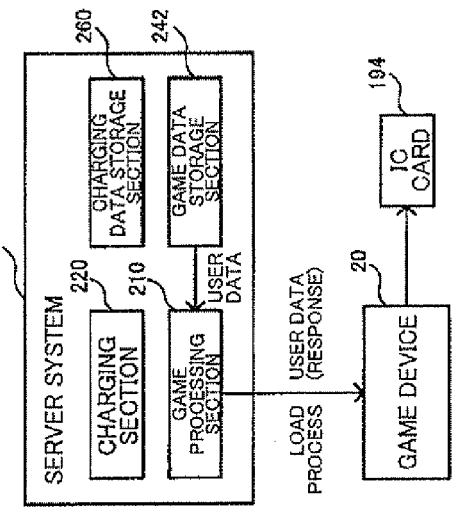
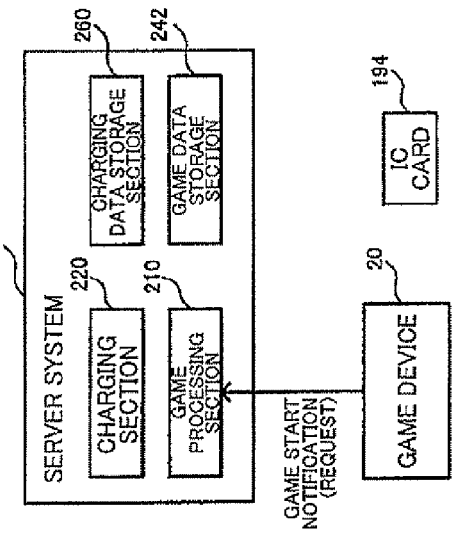
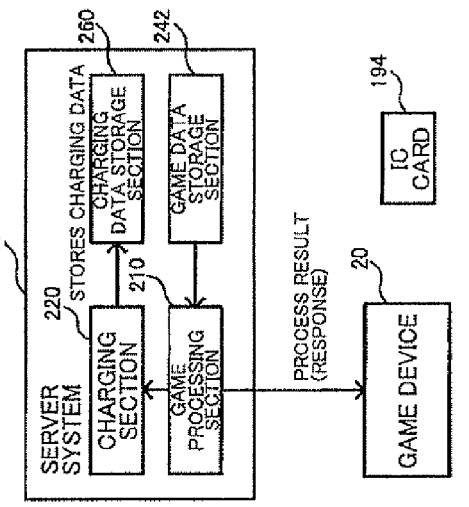
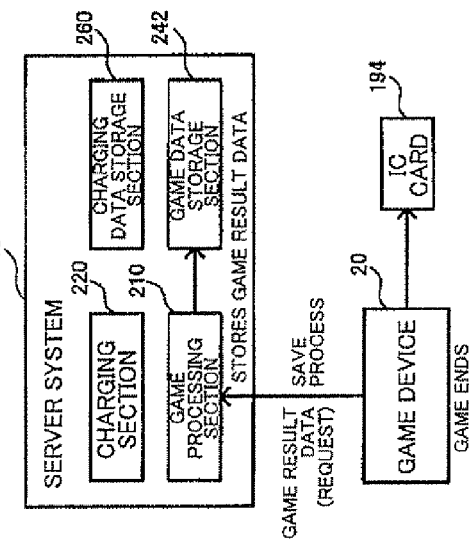

FIG. 6A USER DATA

REQUEST (GAME DEVICE→SERVER)

| |
|---|
| GAME DEVICE (GAME BOARD) ID |
| GAME OPERATING ENTITY (STORE) ID |
| CARD ID |
| CHARACTER DBID |
| CARD USABLE COUNT |

FIG. 6B USER DATA

RESPONSE (SERVER→GAME DEVICE)

| |
|---|
| PROCESS RESULT |
| USER ID |
| USER NAME |
| TEAM ID |
| TEAM NAME |
| COMMENT |
| GRADE ID |
| EXPERIENCE VALUE |
| ITEM INFORMATION |
| TEAM EMBLEM ID |
| TITLE ID |
| PLAYER-VERSUS-PLAYER WIN COUNT |
| PLAYER-VERSUS-PLAYER LOSS COUNT |
| MOBILE MEMBER DETERMINATION WIN/LOSS FLAG |
| TEAM POINTS |
| CHARGING SESSION ID |

FIG. 7A PERSONAL DATA (PERSONAL GAME RESULT DATA)

REQUEST (GAME DEVICE→SERVER)

| |
|---|
| GAME DEVICE (GAME BOARD) ID |
| GAME OPERATING ENTITY (STORE) ID |
| USER ID |
| TEAM ID |
| CHARACTER DBID |
| PLAYER-VERSUS-PLAYER WIN COUNT |
| PLAYER-VERSUS-PLAYER LOSS COUNT |
| PLAYER-VERSUS-GHOST WIN COUNT |
| PLAYER-VERSUS-GHOST LOSS COUNT |
| PLAYER-VERSUS-CPU WIN COUNT |
| PLAYER-VERSUS-CPU LOSS COUNT |
| GRADE ID |
| EXPERIENCE VALUE |
| PLAY TIME |
| USER POINTS |
| TEAM POINTS |
| PLAYER-VERSUS-CPU CLEAR TIME |
| CHARGING SESSION ID |

FIG. 7B PERSONAL DATA

RESPONSE (SERVER→GAME DEVICE)

| |
|---|
| PROCESS RESULT |

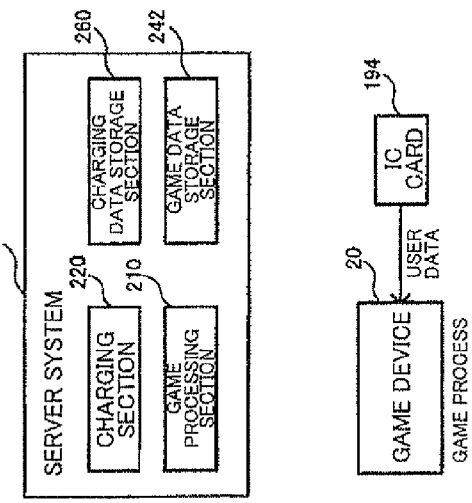
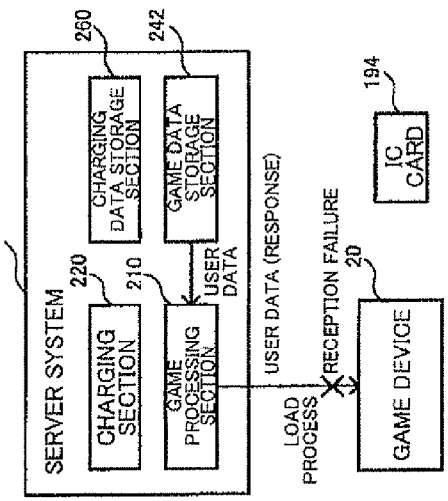
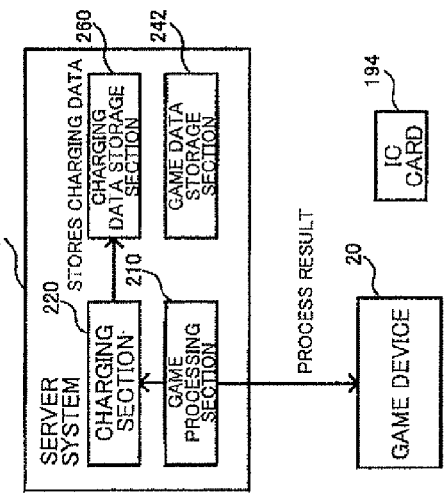
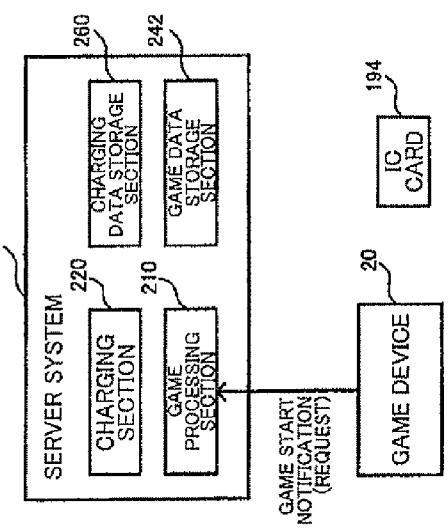
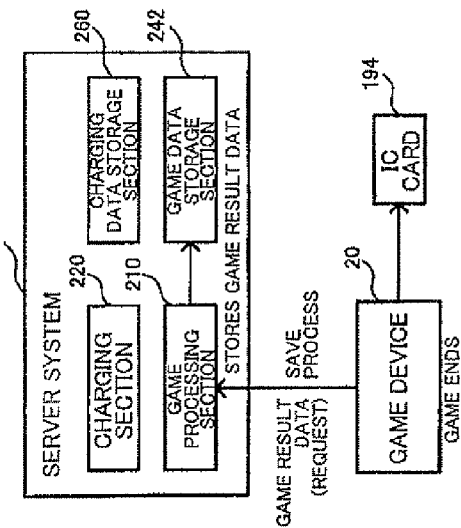

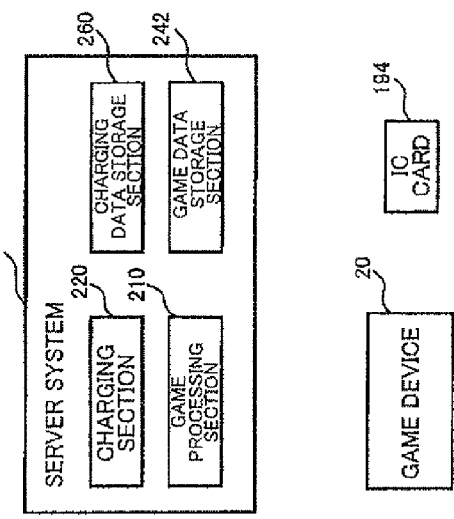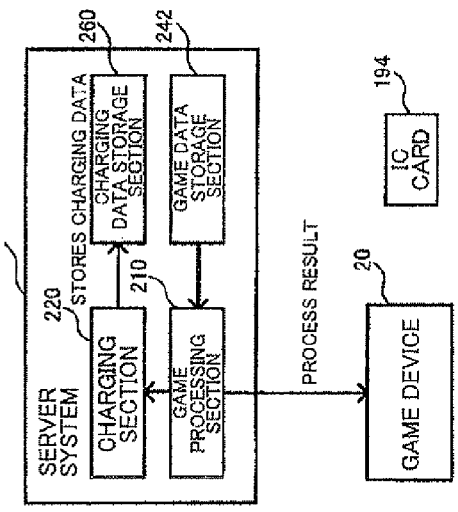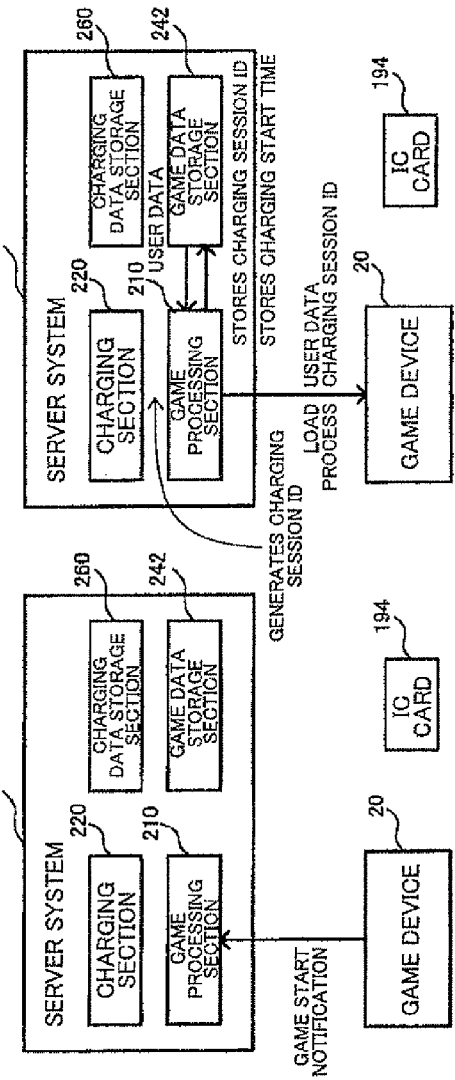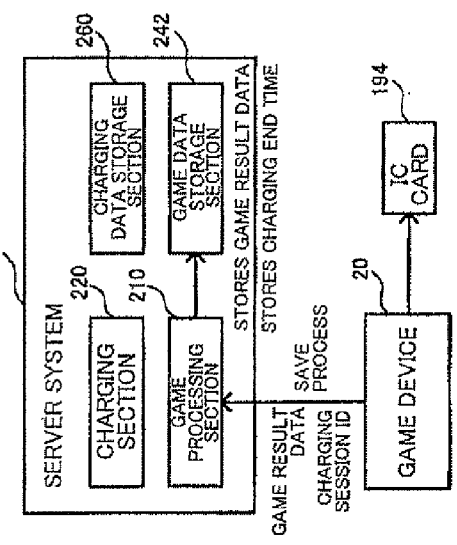

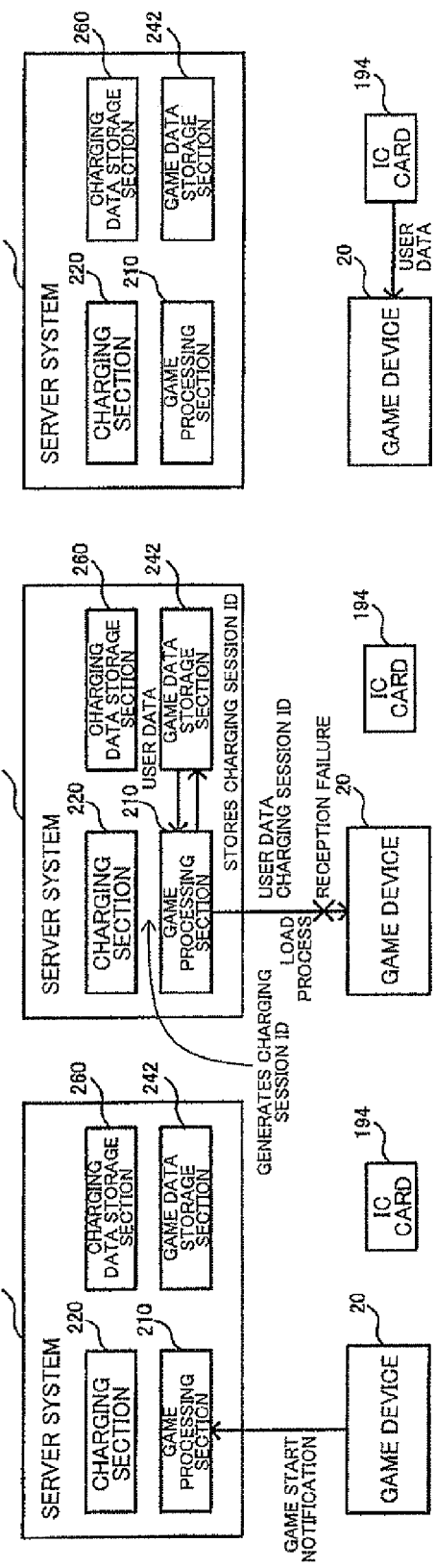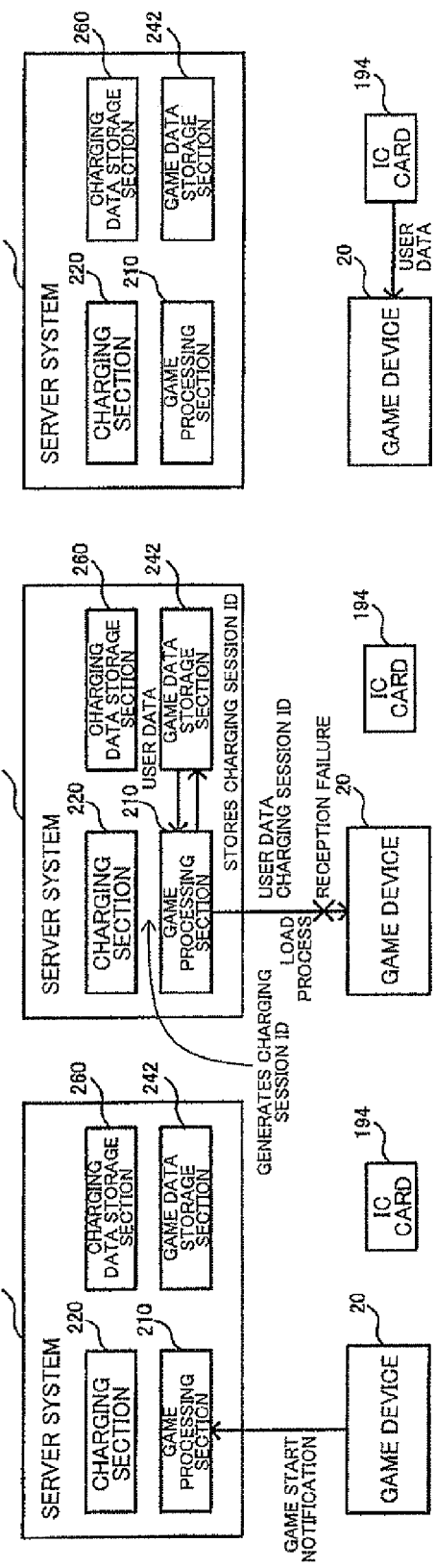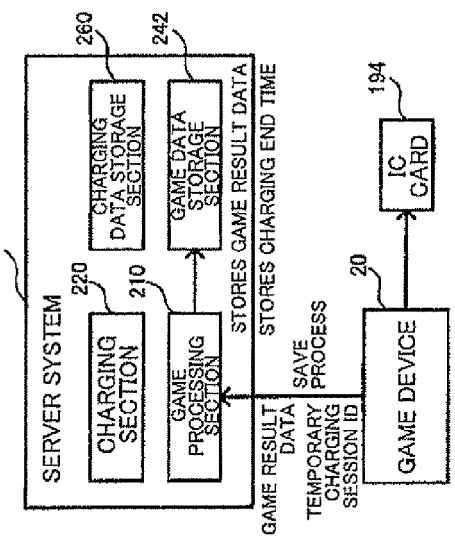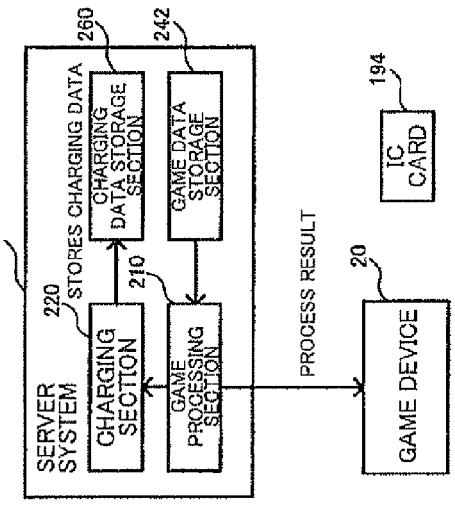

FIG. 12A CHARGING SESSION DATA

| RECEPTION DAY |
|---|
| GAME DEVICE (GAME BOARD) ID |
| GAME OPERATING ENTITY (STORE) ID |
| GAME ID |
| GAME SUB-ID |
| SERVICE TYPE |
| CHARGING START TIME |
| CHARGING END TIME |
| PROCESS FLAG |
| LAST UPDATE TIME |
| CHARGING SESSION ID |

FIG. 12B TOTAL CHARGING DATA

| RECEPTION DAY |
|---|
| SALES DAY |
| GAME DEVICE (GAME BOARD) ID |
| GAME OPERATING ENTITY (STORE) ID |
| GAME ID |
| GAME SUB-ID |
| CHARGING CODE |
| SERVICE CODE |
| CHARGING START COUNT (LOAD COUNT) |
| CHARGING END COUNT (SAVE COUNT) |
| LAST UPDATE TIME |

FIG. 13A  REGISTRATION OF GAME DEVICE (BOARD)
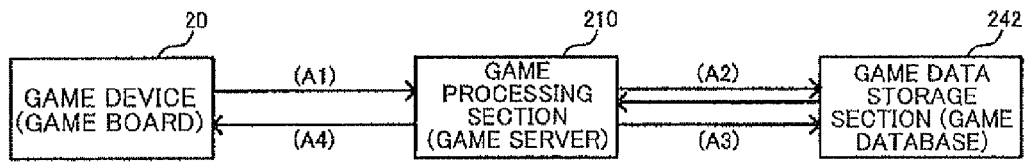
FIG. 13B  LOADING USER DATA
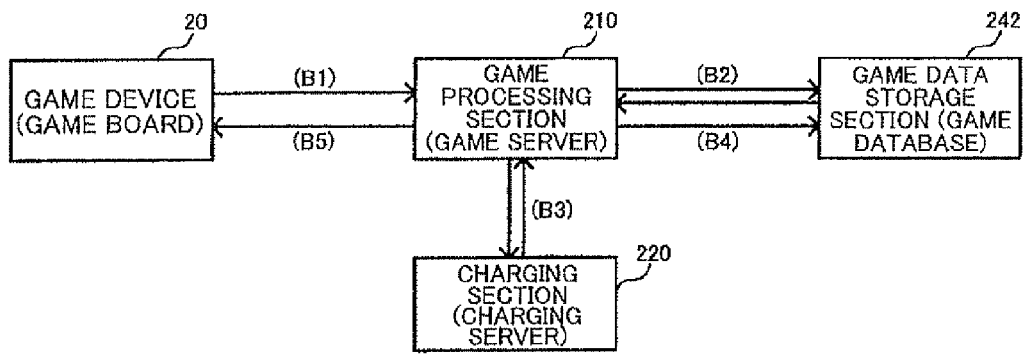
FIG. 13C  NEW CARD REGISTRATION
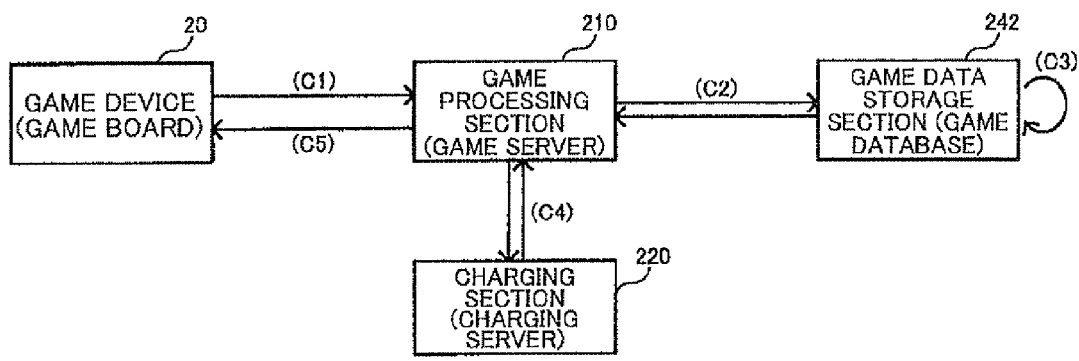
FIG. 13D  SAVING PLAY DATA
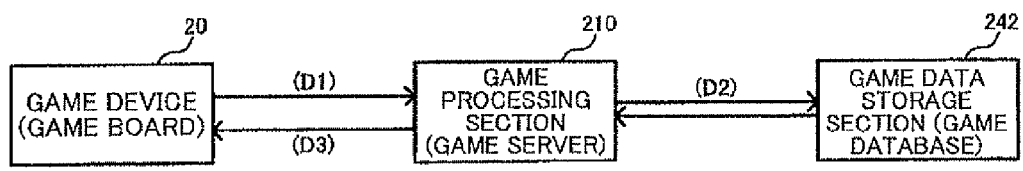

FIG. 14A NEW CARD REGISTRATION DATA

REQUEST (GAME DEVICE→SERVER)

| GAME DEVICE (GAME BOARD) ID |
| --- |
| GAME OPERATING ENTITY (STORE) ID |
| CARD ID |
| FIGHTER ID |
| CARD ISSUANCE ID |

FIG. 14B NEW CARD REGISTRATION DATA

RESPONSE (SERVER→GAME DEVICE)

| PROCESS RESULT |
| --- |
| CHARACTER DBID |
| ITEM INFORMATION |
| CHARGING SESSION ID |

FIG. 15A PLAY DATA (PLAYER-VERSUS-PLAYER GAME RESULT DATA)
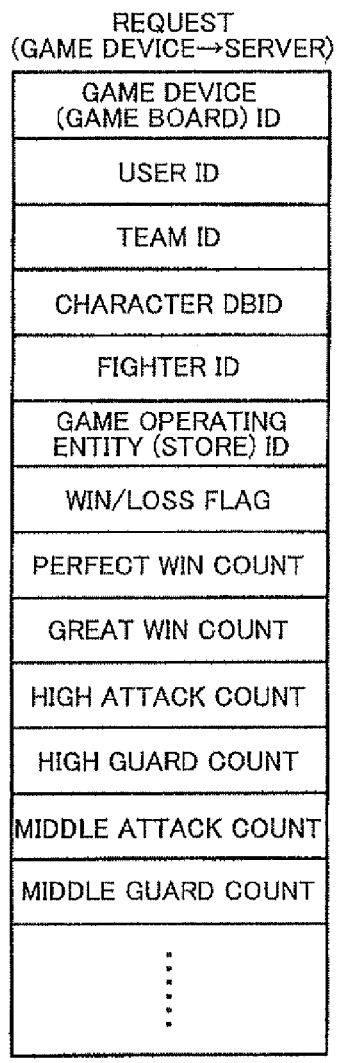
FIG. 15B PLAY DATA
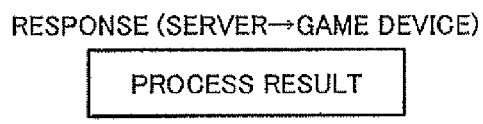

FIG. 16A SAVES PERSONAL DATA
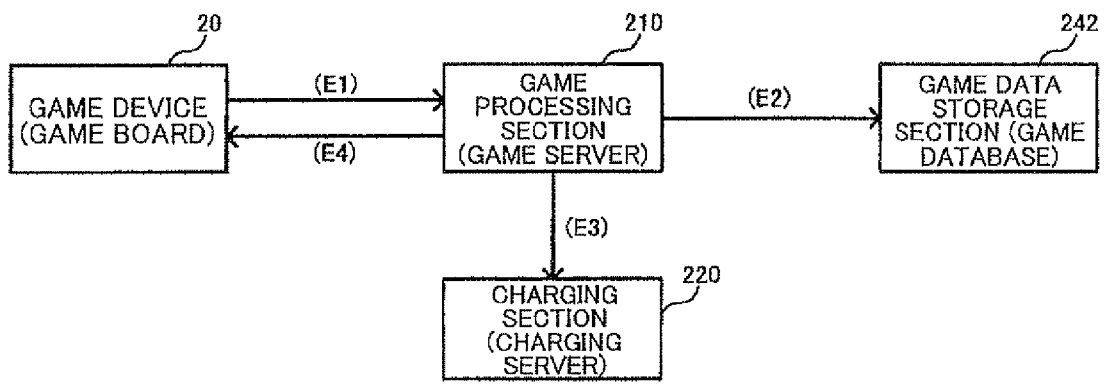
FIG. 16B CHECKS PATCH VERSION
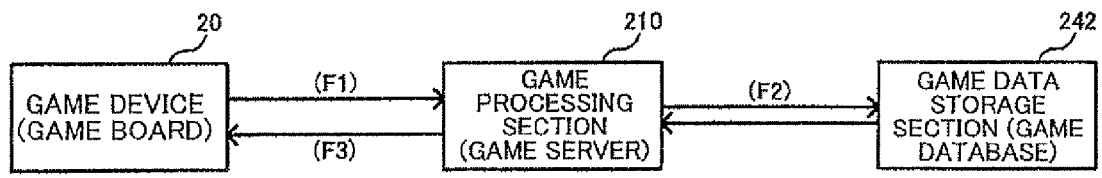
FIG. 16C LOADS PATCH DATA
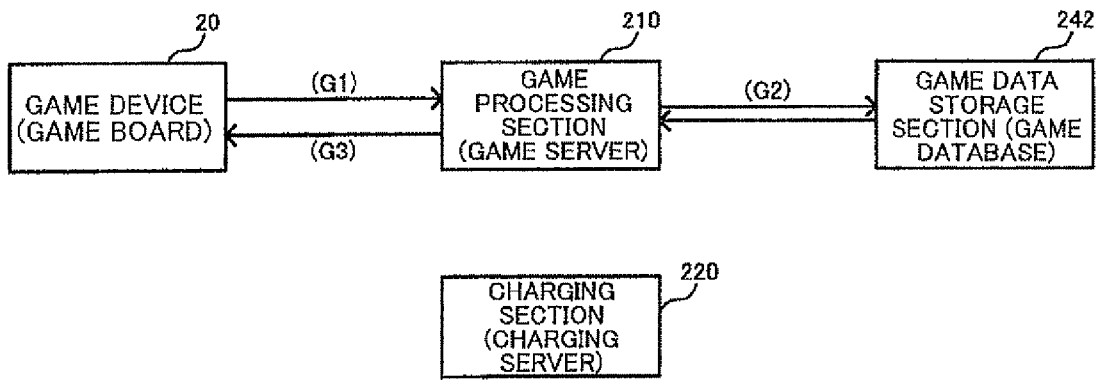

FIG. 17A CHECKS REPLAY DATA (PLAY HISTORY DATA)
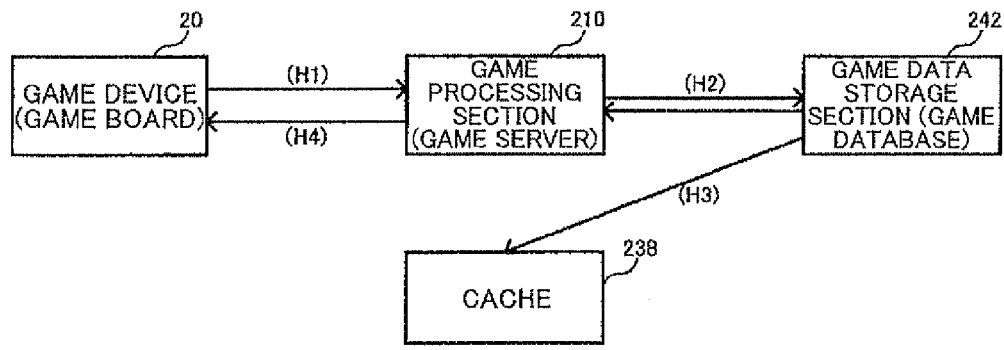
FIG. 17B LOADS REPLAY DATA (PLAY HISTORY DATA)
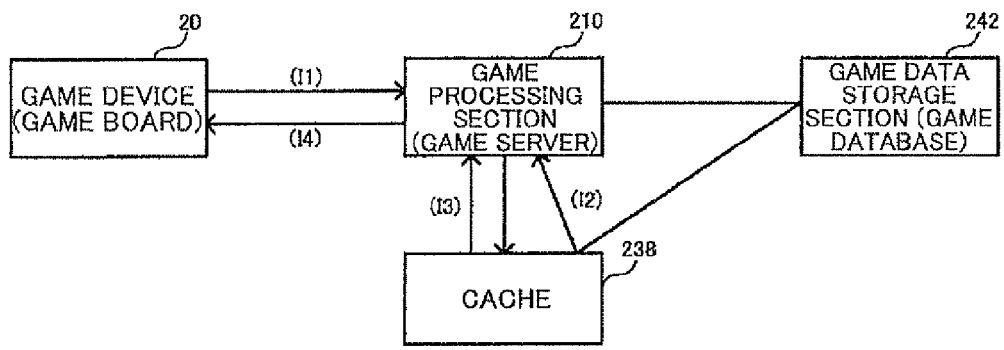
FIG. 17C CHECKS RANKING DATA
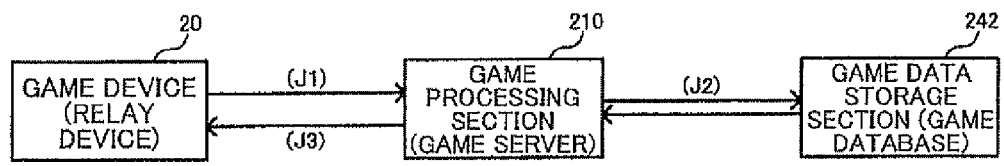
FIG. 17D ACQUIRES RANKING DATA

FIG. 18A ACQUIRES ADVERTISEMENT INFORMATION (SPOT INFORMATION)
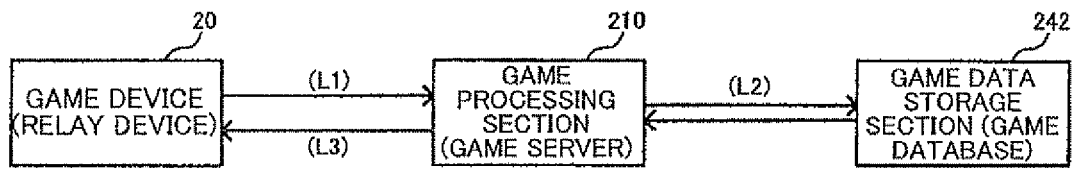
FIG. 18B ACQUIRES TELOP DATA
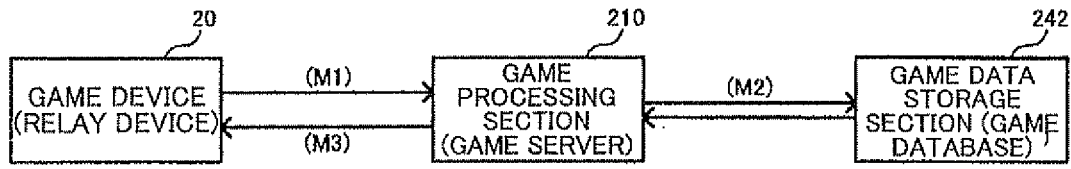
FIG. 18C REGISTERS TELOP DATA
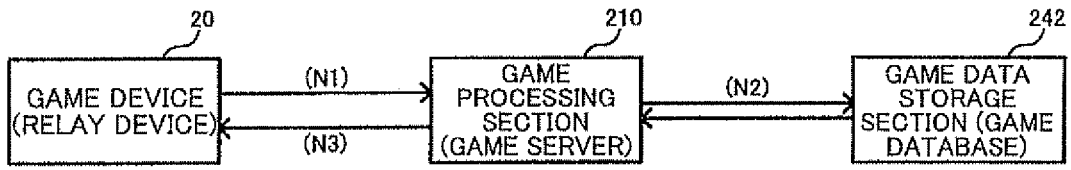

FIG. 19A  PREPARES TO SAVE REPLAY DATA (PLAY HISTORY DATA)
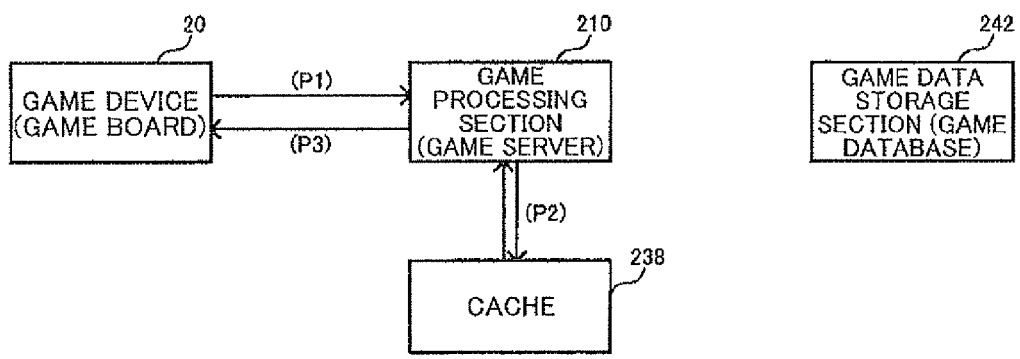
FIG. 19B  SAVES REPLAY DATA (PLAY HISTORY DATA)
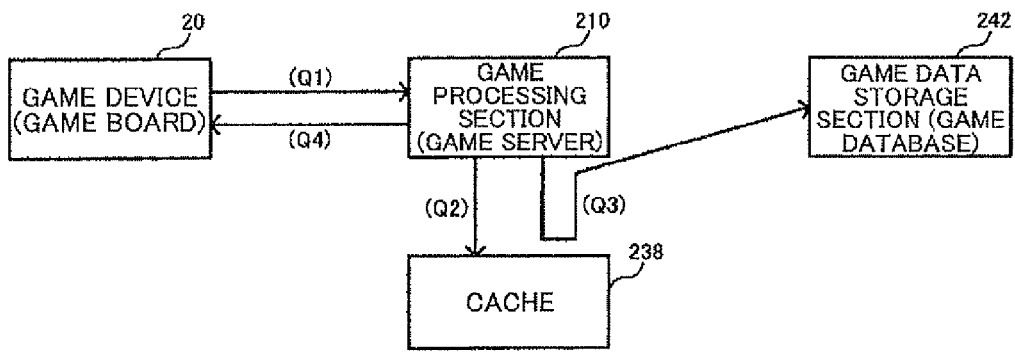

| TIME ZONE | CHARGING RATE |
|---|---|
| 0:00~6:00 | AR11 |
| 6:00~12:00 | AR12 |
| 12:00~18:00 | AR13 |
| 18:00~24:00 | AR14 |

| SALES | CHARGING RATE |
|---|---|
| 0~SEL0 | AR21 |
| SEL0~SEL1 | AR22 |
| SEL1~SEL2 | AR23 |
| ⋮ | ⋮ |

| NUMBER OF IC CARDS SOLD | CHARGING RATE |
|---|---|
| 0~CN0 | AR31 |
| CN0~CN1 | AR32 |
| CN1~CN2 | AR33 |
| ⋮ | ⋮ |

SERVER SYSTEM, GAME DEVICE, CONTROL METHOD, PROGRAM, AND INFORMATION STORAGE MEDIUM

CROSS REFERENCE TO RELATED APPLICATION

This application is a continuation of International Patent Application No. PCT/JP2008/70572, having an international filing date of Nov. 12, 2008, which designated the United States, the entirety of which is incorporated herein by reference. Japanese Patent Application No. 2007-298130 filed on Nov. 16, 2007 is also incorporated herein by reference in its entirety.

BACKGROUND

The present invention relates to a server system, a game device, a control method, a program, an information storage medium, etc.

In recent years, a game that utilizes a network (e.g., Internet) has become widespread. A network game is very popular since the player can enjoy a multi-player game with unspecified players.

A network game requires management/operation of a server system. The management/operation cost may be covered by the sales of game devices. However, this method may be unprofitable when the utilization rate of the network game increases.

As a first charging method for covering the management/operation cost of the server system, the number of coins inserted into each game device may be counted, and the management company of the server system may collect an amount equal to several percent of the sales, for example.

However, a game operating entity (e.g., game facility, gaming arcade) in which game devices are installed may not necessarily have a sufficient communication infrastructure, and the utilization rate of the network game differs depending on the game operating entity. Therefore, a fair charging system may not be achieved by the first charging method.

As a second charging method, the game operating entity may be charged based on the communication time or the data traffic of the network game.

However, the second method requires measuring the communication time or the data traffic in a state in which the server system is always connected to the game device, so that the processing load imposed on the server system increases. JP-A-2003-150808 discloses a related-art charging method for a game device, for example.

SUMMARY

According to one aspect of the invention, there is provided a server system that is communicably connected to a game device that is installed in a game operating entity, the server system comprising:

a game data storage section that stores game data;

a read section that reads user data about a player who plays a game using the game device installed in the game operating entity from the game data storage section;

a transmission section that transmits the user data to the game device before the player starts playing the game;

a reception section that receives game result data about the player obtained by the game device from the game device after the player has finished playing the game;

a write section that writes the received game result data into the game data storage section; and a charging section that performs a charging process that charges the game operating entity for at least one of a load process and a save process, the load process reading the user data from the game data storage section and transmitting the user data to the game device, and the save process receiving the game result data from the game device and writing the game result data into the game data storage section.

According to another aspect of the invention, there is provided a server system that is communicably connected to a game device that is installed in a game server system comprising:

a game data storage section that stores game data;

a read section that reads user data about a player who plays a game using the game device installed in the game operating entity from the game data storage section;

a transmission section that transmits the user data to the game device before the player starts playing the game;

a reception section that receives game result data about the player obtained by the game device from the game device after the player has finished playing the game;

a write section that writes the received game result data into the game data storage section; and a charging section that performs a charging process that charges the game operating entity, the transmission section transmitting the user data and charging session identification information that is linked to the user data to the game device during a load process that reads the user data from the game data storage section and transmits the user data to the game device;

the reception section receiving the game result data and the charging session identification information that is linked to the game result data from the game device during a save process that receives the game result data from the game device and writes the game result data into the game data storage section; and the charging section performing the charging process that charges the game operating entity using the received charging session identification information.

According to another aspect of the invention, there is provided a game device that is communicably connected to the above server system, the game device comprising:

a reception section that receives the user data from the server system;

a game processing section that performs a game process using the received user data;

a transmission section that transmits game result data obtained by the game process to the server system; and an interface section that interfaces between the game device and a player's storage device.

According to another aspect of the invention, there is provided a control method that is implemented by a server system that is communicably connected to a game device that is installed in a game operating entity, the method comprising:

reading user data about a player who plays a game using the game device installed in the game operating entity from a game data storage section that stores game data;

transmitting the user data to the game device before the player starts playing the game;

receiving game result data about the player obtained by the game device from the game device after the player has finished playing the game;

writing the received game result data into the game data storage section; and performing a charging process that charges the game operating entity for at least one of a load process and a save process, the load process reading the user data from the game data storage section and transmitting the user data to the game device, and the save process receiving the game result data from the game device and writing the game result data into the game data storage section.

According to another aspect of the invention, there is provided a control method that is implemented by a server system that is communicably connected to a game device that is installed in a game operating entity, the method comprising:

reading user data about a player who plays a game using the game device installed in the game operating entity from a game data storage section that stores game data;

transmitting the user data to the game device before the player starts playing the game;

receiving game result data about the player obtained by the game device from the game device after the player has finished playing the game;

writing the received game result data into the game data storage section;

performing a charging process that charges the game operating entity;

transmitting the user data and charging session identification information that is linked to the user data to the game device during a load process that reads the user data from the game data storage section and transmits the user data to the game device;

receiving the game result data and the charging session identification information that is linked to the game result data from the game device during a save process that receives the game result data from the game device and writes the game result data into the game data storage section; and performing the charging process that charges the game operating entity using the received charging session identification information.

According to another aspect of the invention, there is provided a program that is stored in a computer program product, the program causing a computer to execute the above control method.

According to another aspect of the invention, there is provided a computer-readable information storage medium storing the above program.

BRIEF DESCRIPTION OF THE DRAWINGS

FIGS. 5A to 5E are views illustrative of a charging process according to one embodiment of the invention.

FIGS. 6A and 6B show data structure examples of user data.

FIGS. 7A and 7B show data structure examples of personal data (game result data).

FIGS. 8A to 8E are views illustrative of a charging process according to one embodiment of the invention when reception failure has occurred.

FIGS. 9A to 9E are views illustrative of a charging process using a charging session ID.

FIGS. 10A to 10E are views illustrative of a charging process according to one embodiment of the invention when reception failure has occurred.

FIGS. 12A and 12B show data structure examples of charging session data.

FIGS. 13A to 13D are views illustrative of a detailed process according to one embodiment of the invention.

FIGS. 14A and 14B show data structure examples of new card registration data.

FIGS. 15A and 15B show data structure examples of play data.

FIGS. 16A to 16C are views illustrative of a detailed process according to one embodiment of the invention.

FIGS. 17A to 17D are views illustrative of a detailed process according to one embodiment of the invention.

FIGS. 18A to 18C are views illustrative of a detailed process according to one embodiment of the invention.

FIGS. 19A and 19B are views illustrative of a detailed process according to one embodiment of the invention.

DESCRIPTION OF EXEMPLARY EMBODIMENTS

Figure 1:
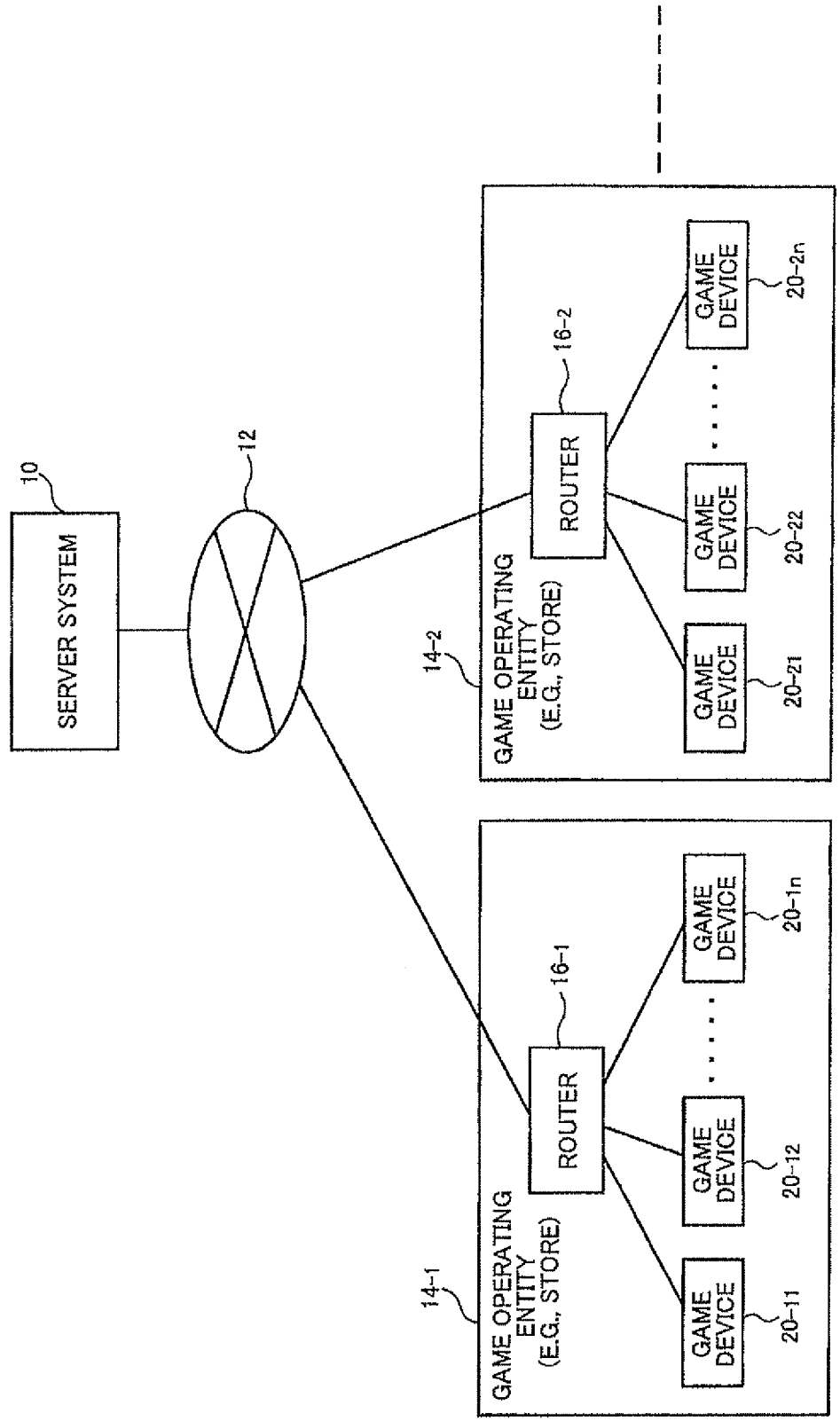
FIG. 1 shows a configuration example of a system according to one embodiment of the invention.

Several embodiments of the invention may provide a server system, a game device, a control method, a program, an information storage medium, etc. that can implement a low-load charging process.

According to one embodiment of the invention, there is provided a server system that is communicably connected to a game device that is installed in a game operating entity, the server system comprising:

a game data storage section that stores game data;

a read section that reads user data about a player who plays a game using the game device installed in the game operating entity from the game data storage section;

a transmission section that transmits the user data to the game device before the player starts playing the game;

a reception section that receives game result data about the player obtained by the game device from the game device after the player has finished playing the game;

a write section that writes the received game result data into the game data storage section; and a charging section that performs a charging process that charges the game operating entity for at least one of a load process and a save process, the load process reading the user data from the game data storage section and transmitting the user data to the game device, and the save process receiving the game result data from the game device and writing the game result data into the game data storage section.

According to this embodiment of the invention, the user data is read from the game data storage section, and transmitted to the game device before the player starts playing the game. The game result data about the player obtained by the game device is received from the game device after the player has finished playing the game, and written into the game data storage section. According to this embodiment of the invention, the charging process is performed for at least one of the load process that reads and transmits the user data and the save process that receives and writes the game result data. This makes it possible to simplify the charging process so that the load imposed by the charging process can be reduced. Moreover, since the game operating entity is charged for utilization of the network service (e.g., load process or save process), a proper and fair charging process can be implemented.

In the server system, the transmission section may transmit the user data to the game device during the load process, the user data including at least one of past game result information about the player, past game result information about a team of the player, game play history information about the player, growth information, experience value information, and equipment information.

Since the past game result, etc. can be reflected in the current game by performing such a user data load process, a game that can attract the player for a long time can be implemented. Moreover, since the game operating entity can be charged for the network service that implements such a game by performing the charging process for the load process via the network, a proper charging process can be implemented.

In the server system, the reception section may receive the game result data from the game device during the save process, the game result data including at least one of game result information about current game play of the player, game result information about current game play of a team of the player, game play history information about the current game play of the player, growth information updated by the current game play, and experience value information updated by the current game play.

Since the current game result can be reflected in the subsequent game by performing such a game result data save process, a game that can attract the player for a long time can be implemented. Moreover, since the game operating entity can be charged for the network service that implements such a game by performing the charging process for the save process via the network, a proper charging process can be implemented.

In the server system, the charging section may perform the charging process for the save process without performing the charging process for the load process.

According to this configuration, the game operating entity can be charged for the save process even if the load process has failed, so that a proper charging process can be implemented.

In the server system, the game device may perform a game process using, user data stored in a player's storage device when the game device has failed to receive the user data transmitted from the server system; and the charging section may perform the charging process for the save process that receives game result data obtained by the game process and writes the game result data into the game data storage section.

According to this configuration, since the game process is performed based on the user data stored in the player's storage device when the game device has failed to receive the user data, a situation in which the player must wait for completion of the process for a long time can be prevented. Moreover, since the game operating entity is charged for the save process, a proper charging process can be implemented.

In the server system, the charging section may perform the charging process on condition that the difference between an execution time of the load process and an execution time of the save process is within a given time.

This makes it possible to prevent a situation in which an improper charging process is performed.

In the server system, the charging section may perform the charging process when the execution time of the save process has been acquired, even if the execution time of the load process has not been acquired.

According to this configuration, the charging process can be performed based on the execution time of the save process even if the execution time of the load process could not be acquired due to failure of reception of the user data.

In the server system, the transmission section may transmit the user data and charging session identification information that is linked to the user data to the game device during the load process;

the reception section may receive the game result data and the charging session identification information that is linked to the game result data from the game device during the save process; and the charging section may perform the charging process using the received charging session identification information.

According to another embodiment of the invention, there is provided a server system that is communicably connected to a game device that is installed in a game operating entity, the server system comprising:

a game data storage section that stores game data;

a read section that reads user data about a player who plays a game using the game device installed in the game operating entity from the game data storage section;

a transmission section that transmits the user data to the game device before the player starts playing the game;

a reception section that receives game result data about the player obtained by the game device from the game device after the player has finished playing the game;

a write section that writes the received game result data into the game data storage section; and a charging section that performs a charging process that charges the game operating entity, the transmission section transmitting the user data and charging session identification information that is linked to the user data to the game device during a load process that reads the user data from the game data storage section and transmits the user data to the game device;

the reception section receiving the game result data and the charging session identification information that is linked to the game result data from the game device during a save process that receives the game result data from the game device and writes the game result data into the game data storage section; and the charging section performing the charging process that charges the game operating entity using the received charging session identification information.

According to this embodiment of the invention, the user data and the charging session identification information that is linked to the user data are transmitted to the game device during the user data load process. The game result data and the charging session identification information that is linked to the game result data are received during the game result data save process. According to this embodiment of the invention, the charging process is performed using the charging session identification information. This makes it possible to specify the charging session based on the charging session identification information, and perform the charging process for the specified charging session, so that the load imposed by the charging process can be reduced.

In the server system, the game device may transmit temporary charging session identification information that is linked to the game result data to the server system during the save process when the game device has failed to receive the charging session identification information transmitted from the server system; and the charging section may regard charging as having started and ended at the same time when the charging section has received the temporary charging session identification information, may generate new charging session identification information, and may perform the charging process based on the generated new charging session identification information.

According to this configuration, even if the game device has failed to receive the user data and issued the temporary charging session identification information, the charging session can be normally terminated to implement the charging process.

In the server system, the charging section may generate charging session data as charging data for charging the game operating entity, the charging session data including the charging session identification information and charging information that is linked to the charging session identification information.

An efficient charging process utilizing the charging session identification information and the charging information can be implemented by generating such charging session data.

In the server system, the charging section may generate the charging session data so that the charging information that includes at least one of an execution time of the load process and an execution time of the save process is linked to the charging session identification information.

If the charging session data includes the execution time of the load process or the charging start time, the charging time can be specified.

In the server system, the charging section may generate total charging data as charging data for charging the game operating entity, the total charging data including identification information about the game operating entity and charging count information about at least one of the load process and the save process.

If the total charging data includes the game operating entity identification information and the charging count information, charging data by which the amount charged can be simply specified can be generated.

In the server system, the charging section may perform the charging process so that the game operating entity is charged a higher fee as an execution count of at least one of the load process and the save process increases.

According to this configuration, the game operating entity is charged a higher fee as the number of times that the game operating entity utilizes the network service increases, so that a fair charging system can be implemented. Moreover, the load imposed by the charging process can be reduced.

the server system, the charging section may include a charging rate change section that variably changes a charging rate for the execution count.

This makes it possible to deal with various situations and demands by changing the charging rate.

In the server system, the charging section may specify a time zone in which the player played the game using the game device, and may change the charging rate based on the specified time zone.

This makes it possible to reduce the burden on the game operating entity or reduce the network load, for example.

In the server system, the charging section may acquire sales result information about the game operating entity based on information received by the reception section, and may change the charging rate based on the acquired sales result information.

This makes it possible to change the charging rate while determining the sales result information by effectively utilizing the network.

the server system, the game device may perform a game process based on data stored in a player's storage device; and the charging section may acquire sales information about the player's storage device in the game operating entity based on information received by the reception section, and may change the charging rate based on the acquired sales information.

This makes it possible to decrease the charging rate preferentially for a game operating entity that sold a large number of player's storage devices, for example.

In the server system, the transmission section may transmit replay data or play history data to the game device or a relay device that is installed in the game operating entity; and the charging section may perform the charging process for the load process that transmits the replay data or the play history data to the game device or the relay device.

This makes it possible to charge the game operating entity for the network service that loads the replay data or the play history data via the network, so that a proper charging process can be implemented.

In the server system, the transmission section may transmit unloaded replay data or unloaded play history data other than the replay data or the play history data that has been loaded into the game device or the relay device to the game device or the relay device; and the charging section may perform the charging process for the load process that transmits the unloaded replay data or the unloaded play history data to the game device or the relay device.

This makes it possible to load the unloaded replay data or play history data, and charge the game operating entity for such a load process.

the server system, the transmission section may transmit ranking data or advertisement information about the game operating entity to the game device or a relay device that is installed in the game operating entity; and the charging section may perform the charging process for the load process that transmits the ranking data or the advertisement information to the game device or the relay device.

This makes it possible to charge the game operating entity for the network service that loads the ranking data or the advertisement information via the network, so that a proper charging process can be implemented.

According to another embodiment of the invention, there is provided a game device that is communicably connected to one of the above server systems, the game device comprising:

a reception section that receives the user data from the server system;

a game processing section that performs a game process using the received user data;

a transmission section that transmits game result data obtained by the game process to the server system; and an interface section that interfaces between the game device and a player's storage device.

In the game device, the game processing section may perform the game process using user data stored in the player's storage device when the game device has failed to receive the user data transmitted from the server system.

This makes it possible to prevent a situation in which the player waits for a long time when reception failure has occurred.

In the game device, the transmission section may stack the game result data when the transmission section has failed to transmit the game result data to the server system, and may transmit the stacked game result data to the server system via background communication.

This makes it possible to transmit the game result data to the server system by utilizing the background communication period.

In the game device, the interface section may restrict removal of the player's storage device until the game result data is completely written into the player's storage device after the player has finished playing the game.

This makes it possible to prevent a situation in which the write data is not normally reflected in the player's storage device, so that a proper charging process can be implemented.

According to another embodiment of the invention, there is provided a control method that is implemented by a server system that is communicably connected to a game device that is installed in a game operating entity, the method comprising:

reading user data about a player who plays a game using the game device installed in the game operating entity from a game data storage section that stores game data;

transmitting the user data to the game device before the player starts the game;

receiving game result data about the player obtained by the game device from the game device after the player has finished playing the game;

writing the received game result data into the game data storage section; and performing a charging process that charges the game operating entity for at least one of a load process and a save process, the load process reading the user data from the game data storage section and transmitting the user data to the game device, and the save process receiving the game result data from the game device and writing the game result data into the game data storage section.

According to another embodiment of the invention, there is provided a control method that is implemented by a server system that is communicably connected to a game device that is installed in a game operating entity, the method comprising:

reading user data about a player who plays a game using the game device installed in the game operating entity from a game data storage section that stores game data;

transmitting the user data to the game device before the player starts playing the game;

receiving game result data about the player obtained by the game device from the game device after the player has finished playing the game;

writing the received game result data into the game data storage section;

performing a charging process that charges the game operating entity;

transmitting the user data and charging session identification information that is linked to the user data to the game device during a load process that reads the user data from the game data storage section and transmits the user data to the game device;

receiving the game result data and the charging session identification information that is linked to the game result data from the game device during a save process that receives the game result data from the game device and writes the game result data into the game data storage section; and performing the charging process that charges the game operating entity using the received charging session identification information.

According to another embodiment of the invention, there is provided a program that is stored in a computer program product, the program causing a computer to execute the above control method.

According to another embodiment of the invention, there is provided a computer-readable information storage medium storing the above program.

Embodiments of the invention are described below. Note that the following embodiments do not in any way limit the scope of the invention laid out in the claims. Note that all elements of the following embodiments should not necessarily be taken as essential requirements for the invention.

1. System Configuration Example

FIG. 1 shows a system configuration example according to one embodiment of the invention. In the system shown in FIG. 1, game devices 20-11, 20-12, and 20-1*n* are installed in a game operating entity 14-1 (store). A router 16-1 (i.e., networking instrument) is installed in the game operating entity 14-1. The game devices 20-11, 20-12, . . . , and 20-1*n* are communicably connected to a server system 10 via the router 16-1 and a network 12. A game operating entity 14-2 is configured in the same manner as the game operating entity 14-1.

The function of the router 16-1 may be implemented by a local server that is installed in the game operating entity 14-1. The term "game operating entity (game facility, game arcade)" refers to an entity (facility) where the player can play the game using the game device. For example, the term "game operating entity" refers to a gaming arcade or the like where a game device that allows the player to play the game upon payment of a fee (e.g., coin) is installed. The game operating entity may be an Internet cafe or the like where a player can play a game without a fee.

The network 12 (communication line) is a communication channel that can transfer data. For example, the network 12 is a communication channel utilizing the Internet, and includes a communication network such as a LAN utilizing a private line (private cable) for direct connection, Ethernet (registered trademark), or the like, a telecommunication network, and a cable network. The communication method may be a cable communication method or a wireless communication method.

The server system 10 is communicably connected to the game devices 20-11 to 20-1*n* installed in the game operating entity 14-1 and the game devices 20-21 to 20-2*n* installed in the game operating entity 14-2 via the network 12 (router or local server). The server system 10 (server device) may be a computer system that includes a processing section that executes various processes, a storage section that stores a program and data, a communication section that transmits and receives data via the network 12, and the like. The server system 10 may include one or more servers (processing servers) and one or more databases (data servers). The server system 10 is provided (installed) by the game software manufacturer or the game device manufacturer, for example. The server system 10 controls the entire system, and manages the network game, for example.

The game devices 20-11 to 20-1n and 20-21 to 20-2n are devices (terminals) that allow the player to play the game. Each of the game devices 20-11 to 20-1n and 20-21 to 20-2n may be a computer system that includes a processing section that executes various processes, a storage section that stores a program and data, an operation section that allows the player to perform an operation input, a display section that displays a game screen and the like, a sound output section that outputs game sound and the like, a communication section that transmits and receives data via the network 12, and the like.

Figure 2:
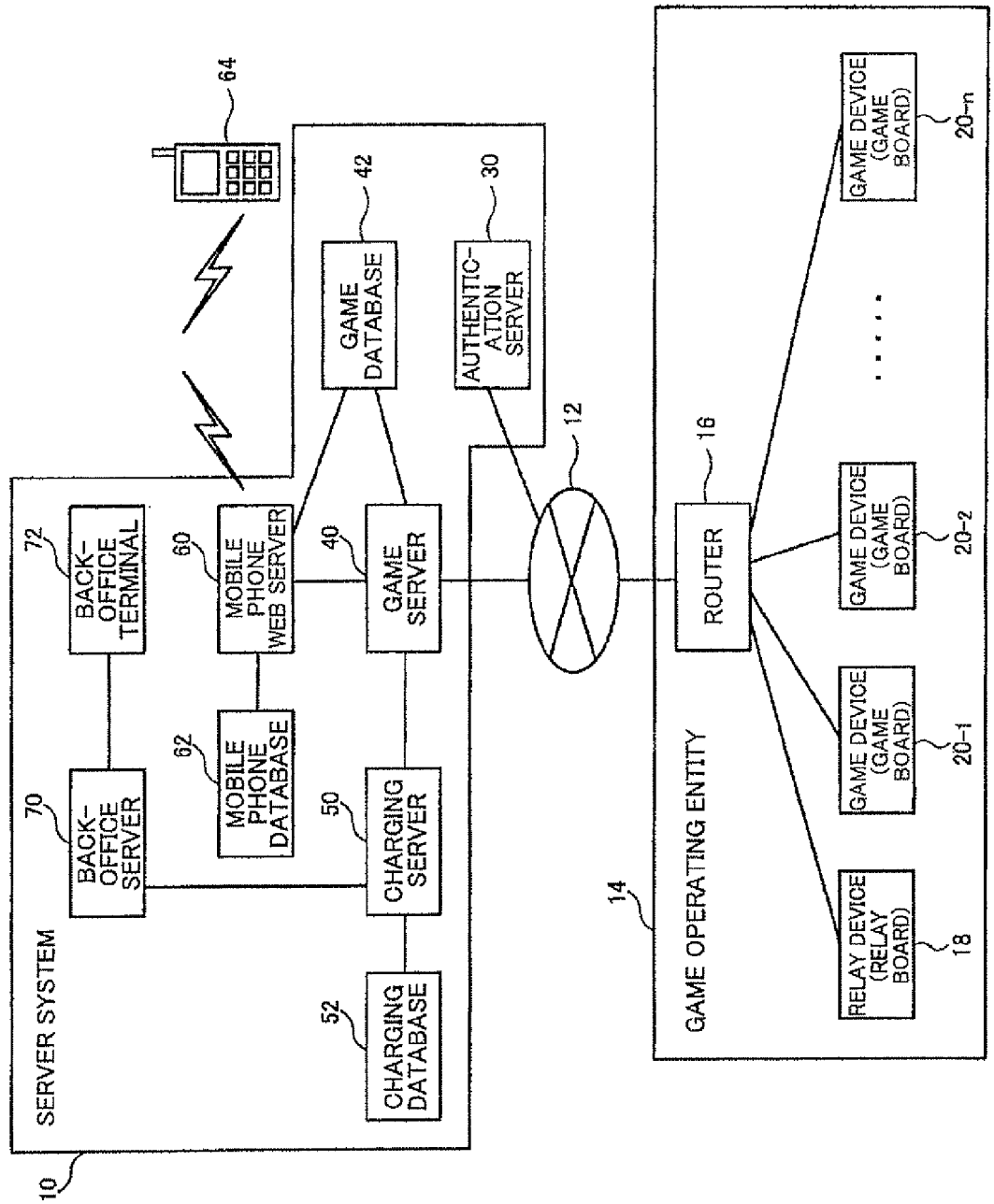
FIG. 2 shows a hardware configuration example of the system shown in FIG. 1.

FIG. 2 shows a hardware configuration example of the system shown in FIG. 1. In FIG. 2, the game devices 20-1 to 20-n are implemented by a game board (circuit board) that is provided with a memory (ROM) that stores a game program, a processor that performs a game process, and the like. A relay device 18 (relay monitor) that displays and relays ranking data and a replay image is installed in the game operating entity 14. The relay device 18 is implemented by a relay board (monitor board or circuit board) that is provided with a memory (ROM) that stores a relay program, a processor that performs a relay process, and the like.

The server system 10 may include an authentication server 30, a game server 40, a game database 42 (game data server), a charging server 50, a charging database 52 (charging data server), a mobile phone web server 60, a mobile phone database 62 (mobile data server), a back-office server 70, and a back-office terminal 72. Note that the server system 10 is not limited to the configuration shown in FIG. 2. Various modifications may be made, such as omitting some (e.g., back-office server, back-office terminal, mobile phone web server, or mobile phone database) of the elements or adding other elements.

The authentication server 30 performs an authentication process on the game devices 20-1 to 20-n (game boards) and the relay device 18 (relay board). The authentication process determines whether or not the game devices 20-1 to 20-n, etc. are genuine.

The game server 40 performs various game processes (e.g., data load process and data save process) necessary for the network game. The game database 42 stores game data necessary for the network game. A game device that has been authenticated by the authentication server 30 can receive various services necessary for the network game from the game server 40.

The charging server 50 performs a charging process for the network game. The charging database 52 stores charging data generated by the charging server 50.

The mobile phone web server 60 implements various services (e.g., item purchase service) utilizing a mobile phone 64 (portable information terminal in a broad sense). The mobile phone database 62 stores data necessary for such services. The back-office server 70 is a server for server management business. The back-office terminal 72 is used for business.

2. Server System

Figure 3:
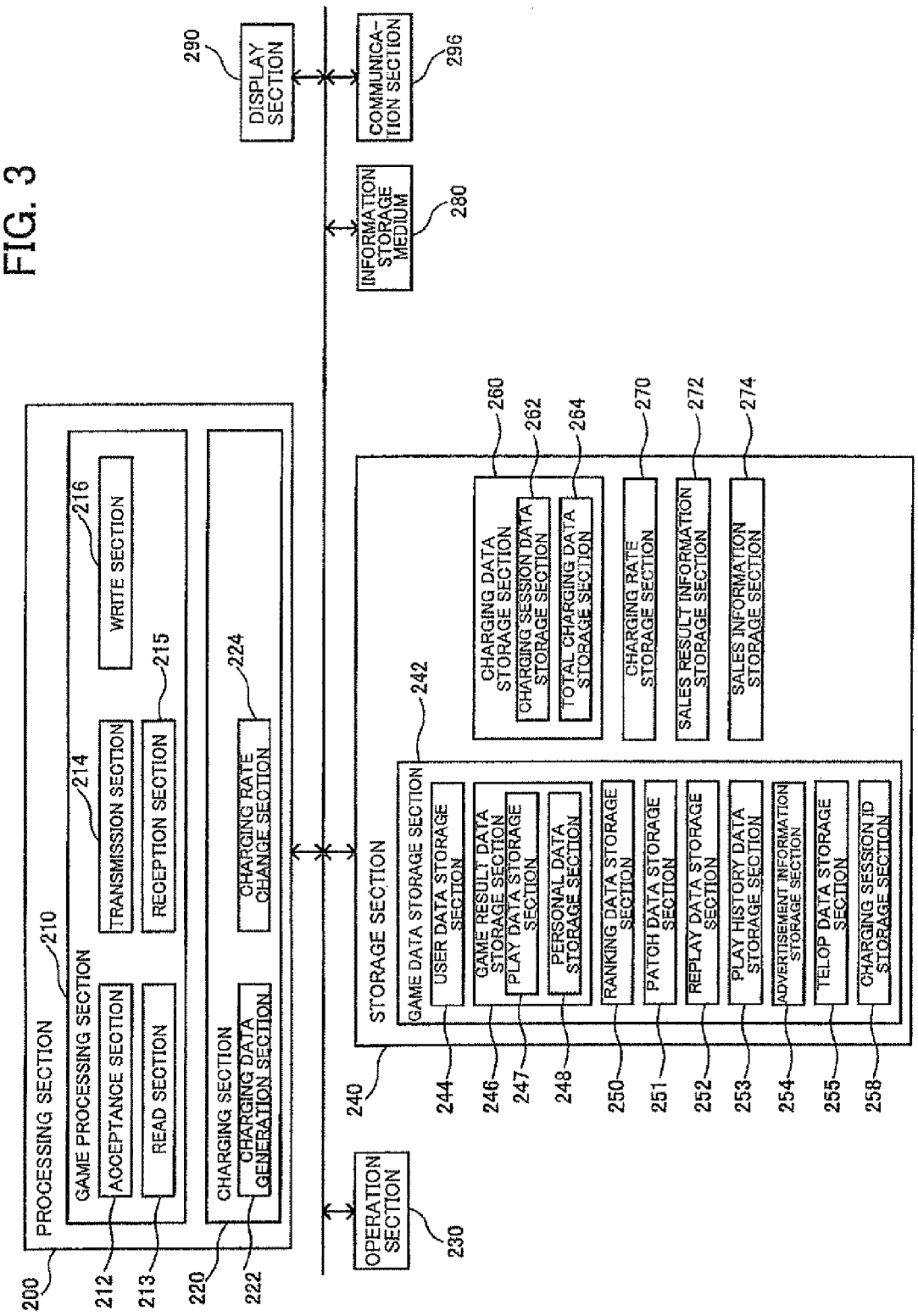
FIG. 3 shows an example of a functional block diagram of a server system according to one embodiment of the invention.

FIG. 3 shows an example of a functional block diagram of the server system according to this embodiment. Note that various modification may be made, such as omitting some of the elements (sections) shown in FIG. 3 or adding other elements.

A processing section 200 performs various processes necessary for various services provided by the server based on data received through a communication section 296, data stored in a storage section 240, a program, and the like. The function of the processing section 200 may be implemented by hardware such as a processor (e.g., CPU or GPU) or an ASIC (e.g., gate array), or a program.

An operation section 230 allows the system administrator/operator to input information. The storage section 240 serves as a work area for the processing section 200, the communication section 296, and the like. The function of the storage section 240 may be implemented by a RAM or the like. An information storage medium 280 (computer-readable medium) stores a program, data, and the like. The function of the information storage medium 280 may be implemented by an optical disk (CD or DVD), a hard disk drive (HDD), a memory (e.g., ROM), or the like. A display section 290 displays information to the system administrator/operator. A communication section 296 communicates with the game device or another server via the cable or wireless network 12. The function of the communication section 296 may be implemented by hardware (e.g., communication ASIC or communication processor) or communication firmware.

The processing section 200 includes a game processing section 210 and a charging section 220. The game processing section 210 performs various game processes (i.e., processes necessary for the game process of the game device and processes necessary for the services of the server system). For example, the game processing section 210 may be implemented by the game server 40 shown in FIG. 2 or the like. The charging section 220 performs a charging process (e.g., charging data generation process, storage process, and charging rate change process). For example, the charging section 220 may be implemented by the charging server 50 shown in FIG. 2 or the like.

The game processing section 210 includes an acceptance section 212, a read section 213, a transmission section 214, a reception section 215, and a write section 216. Note that the game processing section 210 may have a configuration in which some (e.g., acceptance section) of these elements are omitted.

The acceptance section 212 accepts a process request from a client (e.g., game device). The server system according to this embodiment does not take account of the internal state of an individual client. Specifically, the acceptance section 212 waits for arrival of a process request (request data) from the client. When the acceptance section 212 has accepted a request from the client, the acceptance section 212 performs the process designated by the request. After completion of the process, the acceptance section 212 waits for arrival of the next request. According to this configuration, since the server system need not always communicate with (poll) the client, the load imposed by the communication process can be significantly reduced.

The read section 213 reads data from the storage section 240. For example, the read section 213 reads user data of the player who plays the game using the game device from the game data storage section 242. Specifically, the read section 213 reads the user data stored in a user data storage section 244 when the acceptance section 212 has accepted a game start notification request transmitted from the game device (i.e., client).

The term "user data" refers to data that must be previously loaded into the game device so that the game device can perform the game process (game advancing process, game result calculation process, image generation process, and sound generation process). Examples of the user data include data (customization data) peculiar to the player (user) and the like. The user data may include at least one of past game result information (e.g., the number of wins and the number of losses) about the player, past game result information (e.g., team points) about the team of the player, game play history information (e.g., game play time and game play count) about the player, growth information (e.g., growth information, level, and grade of character), experience value information (e.g., experience value information and experience points of character), and equipment information (e.g., equipment information, emblem, and title of character). The user data may include at least one of identification information (e.g., user ID and user name) about the player and identification information (e.g., team ID and team name) about the team of the player.

The transmission section 214 transmits data. For example, the transmission section 214 transmits the user data to the game device before the player starts playing the game. Specifically, the transmission section 214 instructs the communication section 296 to transmit the user data read from the user data storage section 244 by the read section 213 so that the communication section 296 transmits the user data to the game device (game operating entity) via the network.

The reception section 215 receives data. For example, the reception section 215 receives game result data from the game device after the player has finished playing the game, the game result data indicating the game result of the player using the game device. Specifically, when the player has finished playing the game using the game device (game over) and the game device has transmitted the game result data as the request data, the reception section 215 receives the game result data transmitted from the game device via the network and the communication section 296.

The term "game result data" refers to data that notifies the server system of the result of the current game play using the game device, and the like. The game result data may include at least one of game result information (e.g., the number of wins, the number of losses, user points, and clear time) about the current game play of the player, game result information (e.g., team points) about the current game play of the team of the player, game play history information (e.g., game play count and game play time) about the current game play of the player, growth information (e.g., level and grade of character) updated (acquired) by the current game play, and experience value information (e.g., experience value of character) updated (acquired) by the current game play. The game result data may include at least one of identification information (e.g., user ID) about the player, identification information (e.g., team ID) about the team of the player, and identification information (e.g., character DBID) about the character.

The write section 216 writes data into the storage section 240. For example, the write section 216 writes the received game result data into the game data storage section 242. Specifically, when the game device has transmitted the game result data (personal data) when the game has ended, and the reception section 215 has received the game result data, the write section 216 writes the received game result data into a game result data storage section 246 (personal data storage section).

The charging section 220 performs the charging process for at least one of a load process (transmission process) that reads the user data from the game data storage section 242 (user data storage section 244) and transmits the user data to the game device, and a save process (reception process) that receives the game result data from the game device and writes the game result data into the game data storage section 242 (game result data storage section 246). For example, the charging section 220 performs the charging process so that the amount charged increases as the execution count (charging start count or charging end count) of at least one of the load process and the save process increases.

For example, the charging section 220 may perform the charging process for only the save process without performing the charging process for the load process. Specifically, when the game device has failed to receive the user data transmitted from the server system, the game device performs the game process using the user data stored in a player's storage device (e.g., IC card or memory card). In this case, the charging section 220 receives the game result data about the game process performed using the user data stored in the player's storage device (e.g., portable storage device). The charging section 220 performs the charging process for only the save process that writes the game result data into the game data storage section 242. The charging section 220 performs the charging process on condition that the difference between the execution time of the load process (charging start time) and the execution time of the save process (charging end time) is within a given time. The charging section 220 performs the charging process when the execution time of the save process has been acquired, even if the execution time of the load process has not been acquired.

The transmission section 214 transmits the user data and a charging session ID (identification information) to the game device during the load process. The reception section 215 receives the game result data and the charging session ID from the game device during the save process. In this case, the charging section 220 performs the charging process using the received charging session ID. For example, the charging section 220 performs the charging process so that the amount charged increases as the number of generated charging session IDs increases. When the game device has failed to receive the charging session ID from the server system and transmitted a temporary charging session ID, the charging section 220 generates a new charging session ID. The charging section 220 performs the charging process based on the new charging session ID generated by the charging section 220. Specifically, the charging section 220 regards charging as having started (load) and ended (save) at the same time, and performs the charging process. The charging session ID is stored in a charging session ID storage section 258.

The charging section 220 includes a charging data generation section 222 and a charging rate change section 224. The charging data generation section 222 generates charging data.

Specifically, the charging data generation section 222 generates charging session data as the charging data for charging the game operating entity. The charging data generation section 222 stores the charging session data in a charging session data storage section 262 of a charging data storage section 260. The charging session data includes charging session ID and charging information that is linked to the charging session ID. The charging information that is linked to the charging session ID may include at least one of the execution time of the load process (charging start time) and the execution time of the save process (charging end time), for example. The charging information may include at least one of the ID (board ID) of the game device, identification information (game ID or game sub-ID) about the game played by the player using the game device, and the game play mode of the player using the game device.

The charging data generation section 222 also generates total charging data as the charging data for charging the game operating entity. The charging data generation section 222 stores the total charging data in a total charging data storage section 264 of the charging data storage section 260. The total charging data may include identification information (store ID) about the game operating entity and charging count information (charging start count and charging end count) about at least one of the load process and the save process.

The charging rate change section 224 changes the charging rate. Specifically, the charging rate change section 224 variably changes the charging rate (i.e., multiplication coefficient) for the execution count (charging start count and charging end count) of at least one of the load process and the save process. For example, the charging rate change section 224 specifies the time zone in which the player played the game using the game device, and changes the charging rate based on the specified time zone (time zone information or time information). Alternatively, the charging rate change section 224 acquires sales result information (business result information) about the game operating entity based on information received by the reception section 215, and changes the charging rate based on the acquired sales result information. Alternatively, the charging rate change section 224 acquires sales information (sales volume, sales, or total sales) about the player's storage device (IC card, mobile phone, or portable game device) in the game operating entity based on information received by the reception section 215, and changes the charging rate based on the acquired sales information. The charging rate, the sales result information, and the sales information are respectively stored in a charging rate storage section 270, a sales result information storage section 272, and a sales information storage section 274.

The transmission section 214 transmits replay data stored in a replay data storage section 252 or play history data (ghost data) stored in a play history data storage section 253 to the game device (or the relay device installed in the game operating entity). The charging section 220 may perform the charging process for the load process that transmits the replay data or the play history data to the game device (or the relay device). In this case, the charging section 220 may perform the charging process for the load process that transmits the unloaded (latest) replay data or play history data that is not loaded into the game device to the game device (relay device).

The transmission section 214 transmits ranking data or advertisement information (spot information) about the game operating entity (store) to the game device (or the relay device). The charging section 220 may perform the charging process for the load process that transmits the ranking data or the advertisement information to the game device (or the relay device).

Game program patch data, the advertisement information, and telop data are respectively stored in a patch data storage section 251, an advertisement information storage section 254, and a telop data storage section 255.

3. Game Device

Figure 4:
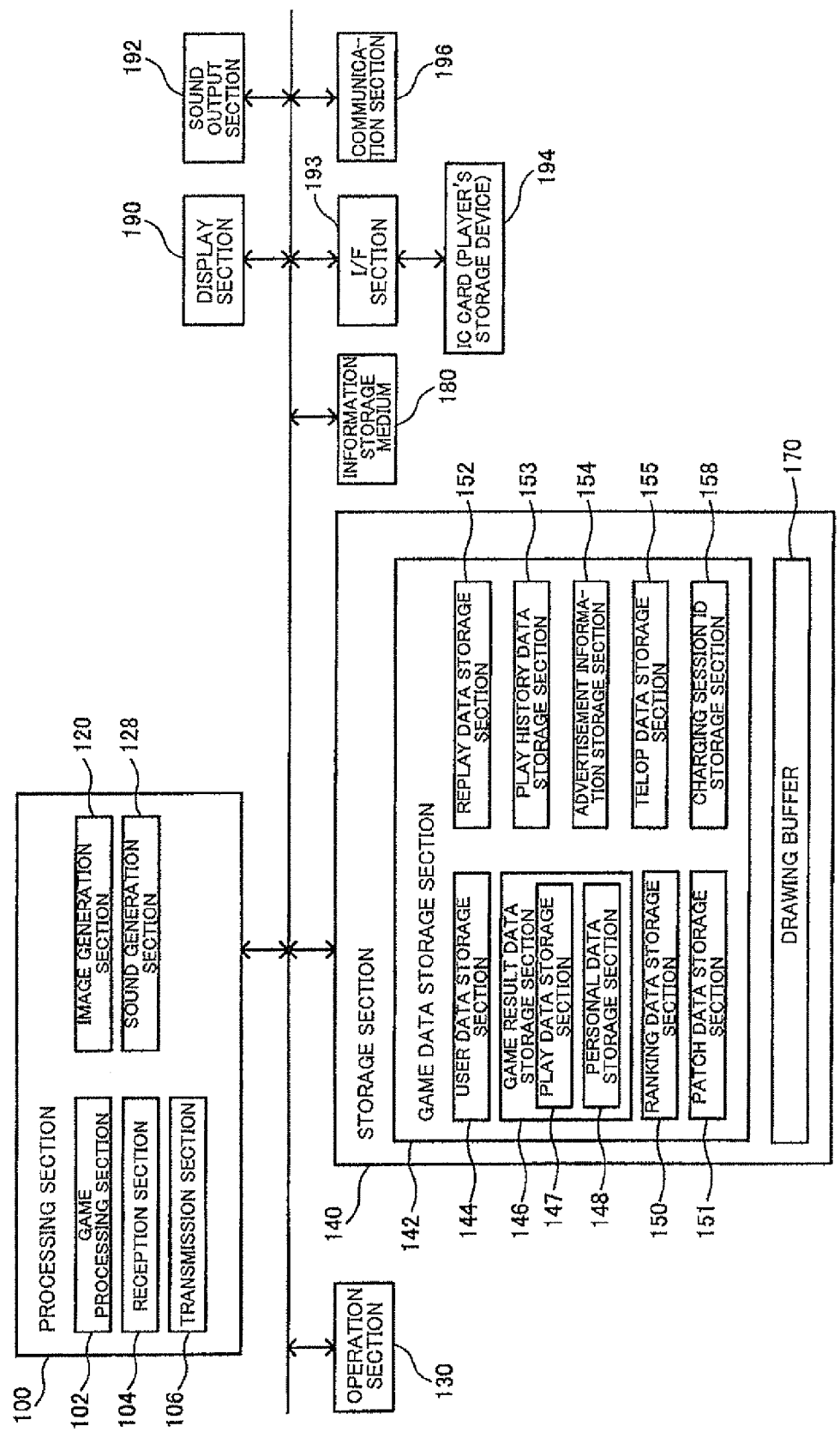
FIG. 4 shows an example of a functional block diagram of a game device according to one embodiment of the invention.

FIG. 4 shows an example of a functional block diagram of the game device according to this embodiment. Note that various modification may be made, such as omitting some of the elements (sections) shown in FIG. 4 or adding other elements.

An operation section 130 allows the player to input operation data. The function of the operation section 130 may be implemented by a direction key, an operation button, a touch panel display, or the like. A storage section 140 serves as a work area for a processing section 100, a communication section 196, and the like. The function of the storage section 140 may be implemented by a RAM (DRAM or VRAM) or the like. An information storage medium 180 (computer-readable medium) stores a program, data, and the like. The function of the information storage medium 180 may be implemented by an optical disk, an HDD, a memory, or the like. The processing section 100 performs various processes according to this embodiment based on a program (data) stored in the information storage medium 180.

A display section 190 outputs an image generated according to this embodiment. The function of the display section 190 may be implemented by a CRT, an LCD, a touch panel display, a head mount display (HMD), or the like. A sound output section 192 outputs sound generated according to this embodiment. The function of the sound output section 192 may be implemented by a speaker, a headphone, or the like.

An I/F (interface) section 193 interfaces between the game device and an IC card 194 (player's storage device in a broad sense) possessed by the player. Specifically, the I/F section 193 (card reader-writer) performs an access process such as reading data from the IC card 194 or writing data into the IC card 194. The IC card 194 is removable, and stores a player's personal data, for example.

The player's storage device according to this embodiment is not limited to the IC card 194, but may be any of various readable-writable storage devices. For example, a portable communication terminal such as a mobile phone may be used as the player's storage device, and data may be read or written by utilizing a wireless communication function or the like.

The communication section 196 communicates with the outside (e.g., server system) via a cable or wireless network. The function of the communication section 196 may be implemented by hardware (e.g., communication ASIC or communication processor) or communication firmware.

The processing section 100 (processor) performs a game process, an image generation process, a sound generation process, and the like based on operation data from the operation section 130, a program, and the like. The processing section 100 performs various processes using the storage section 140 as a work area. The function of the processing section 100 may be implemented by hardware such as a processor (e.g., CPU or GPU) or an ASIC (e.g., gate array), or a program.

The processing section 100 includes a game processing section 102, a reception section 104, a transmission section 106, an image generation section 120, and a sound generation section 128. Note that the processing section 100 may have a configuration in which some of these sections are omitted.

The game processing section 102 performs a game process (game calculation process) that allows the player to play the game. The game process includes starting the game when game start conditions have been satisfied, proceeding with the game, calculating the game result, and finishing the game when game finish conditions have been satisfied, for example.

The reception section 104 receives the user data from the server system. The game processing section 102 performs the game process using the received user data. Specifically, the game processing section 102 generates a game image or game sound that reflects the user data. The received user data is stored in a user data storage section 144.

The transmission section 106 transmits the game result data to the server system. Specifically, the transmission section 106 transmits the game result data obtained as a result of the game process performed by the game processing section 102 to the server system.

The image generation section 120 performs a drawing process based on the results of various game processes performed by the game processing section 102 to generate a game image, writes the game image into a drawing buffer 170, and outputs the game image to the display section 190. In this case, the game image displayed on the display section 190 may be a three-dimensional image or a two-dimensional image.

The sound generation section 128 performs a sound process based on the results of the game processes performed by the game processing section 102 to generate game sound (e.g., background music (BGM), effect sound, or voice), and outputs the game sound to the sound output section 192. The storage sections of the game data storage section 142 respectively store the user data, the game result data, the ranking data, the patch data, the replay data, the play history data, the advertisement information, the telop data, and the charging session ID.

In this embodiment, when the game device has failed to receive the user data transmitted from the server system, the game processing section 102 performs the game process using the user data stored in the IC card 194 (player's storage device). When the transmission section 106 has failed to transmit the game result data to the server system, the transmission section 106 stacks the game result data in a game result data storage section 146 or the like, and transmits the stacked game result data to the server system via background communication. In this case, the I/F section 193 restricts removal of the IC card 194 (e.g., moves a restriction member) until the game result data (game data) is completely written into the IC card 194 after the player has finished playing the game.

4. Method According to this Embodiment 4.1 Charging Process

The charging process according to this embodiment is described below with reference to FIGS. 5A to 5E. As shown in FIG. 5A, when the player has started the game using the game device 20, the game device 20 transmits a request for the user data load process to the server system 10 to notify the server system 10 that the game has started. Specifically, when the player has started playing the game by inserting a coin into the game device 20 or inserting the IC card 194 into a card insertion section, the game device 20 transmits a request to the server system 10. As shown in FIG. 6A, the request data includes a game device (board) ID, a game operating entity (store) ID, a card ID, a character DBID, a card usable count, and the like. The game device ID is the ID of the game device that has transmitted the request. The game operating entity ID is the ID of the game operating entity that has been received from the authentication server during authentication. The card ID is a unique ID that is recorded on the IC card 194. The character DBID (i.e., the ID of the character database) is an index of character data on the game data storage section 242 (game database). The card usable count is the usable count of the IC card 194.

The server system 10 can specify the game device that has transmitted the request and the game operating entity in which the game device that has transmitted the request is installed based on the game device ID and the game operating entity ID. The server system 10 can specify the user data that should be transmitted to the game device 20 in response to the request based on the character DBID. The character DBID is created when the player has purchased the IC card 194 and registered himself, and specifies the player and the character (fighter) used by the player.

As shown in FIG. 5B, the server system 10 (game server or game processing section) that has been notified that the game has started performs the load process that reads the user data from the game data storage section 242 and transmits the user data (i.e., response data) to the game device 20.

As shown in FIG. 6B, the user data (response data) includes a user ID, a user name, a team ID, a team name, a comment, a grade ID, an experience value, item information, a team emblem ID, a title ID, a player-versus-player win count, a player-versus-player loss count, a mobile member determination flag, and team points, for example. A charging session ID is linked to the user data. The user data and the charging session ID are respectively stored in the user data storage section 144 and the charging session ID storage section 158 of the game device 20 shown in FIG. 4.

The user ID included in the user data shown in FIG. 6B is the ID of the player (user), and the user name is a name input by the player. The team ID is the ID of the team of the player, and the team name is the name of the team. The comment is a comment set by the player. The grade ID is the ID of the grade of the player's character. The experience value is the experience value that has been acquired by the character, and is used to calculate the grade. The item information is information about an item (e.g., gloves, hat, or pendant) worn by the character. The item can be purchased from the web service utilizing the mobile phone 64 shown in FIG. 2. The team emblem ID is the ID of the emblem of the team of the player. The title ID is the ID of the title (e.g., "strong" or "four heavenly kings") of the character. The title can be purchased from the web service utilizing the mobile phone 64. The player-versus-player win count is the cumulative number of wins in the player-versus-player mode, and the player-versus-player loss count is the cumulative number of losses in the player-versus-player mode. The mobile member determination flag is a flag used to determine whether the player is a member of the web service utilizing the mobile phone 64. The team points are points that have been acquired by the team of the player.

The charging session ID is an ID that identifies a charging session that includes one load process and one save process. In this embodiment, the user data (player data) and the charging session ID that is linked to the user data (player data) are transmitted from the server system 10 to the game device 20 during the user data load process.

As shown in FIG. 5C, the game device 20 performs the game process after the user data load process, and the player starts playing a fighting game, a racing game, or the like. The game device 20 performs the game process using the user data that has been loaded into the game device 20 as shown in FIG. 5B. For example, the user name and the team name are displayed on the game screen, or the grade and the experience value of the character are set based on the grade ID and the experience value included in the user data. The character that appears on the game screen is equipped with the item that is set based on the item information, and the team emblem and the title are assigned to the character. The player-versus-player win count, the player-versus-player loss count, and the team points included in the user data are updated based on the game play of the player.

When the game using the game device 20 has ended, the game device 20 transmits a request for the game result data save process to notify the server system 10 that the game has ended (see FIG. 5D). Specifically, when the player has been defeated (e.g., the player's winning streak has ended) (game over), the game device 20 transmits the game result data (request data) to the server system 10. As shown in FIG. 7A, personal data (game result data) includes a game device ID, a game operating entity ID, a user ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time, and the like. The charging session ID is linked to the personal data (game result data). The game result data and the charging session ID are respectively stored in the game result data storage section 246 and the charging session ID storage section 258 of the server system 10 shown in FIG. 3.

The player-versus-player win count included in the personal data shown in FIG. 7A is the number of wins achieved by the player in the current player-versus-player mode, the player-versus-ghost win count is the number of wins achieved by the player in the current player-versus-ghost mode, and the player-versus-CPU win count is the number of wins achieved by the player in the current player-versus-CPU mode. The player-versus-player loss count is the number of losses sustained by the player in the current player-versus-player mode, the player-versus-ghost loss count is the number of losses sustained by the player in the current player-versus-ghost mode, and the player-versus-CPU loss count is the number of losses sustained by the player in the current player-versus-CPU mode. The player-versus-player loss count, the player-versus-ghost loss count, and the player-versus-CPU loss count are normally "1" or "0". The grade ID is the ID of the grade of the character that reflects the current game play result. The experience value is the experience value updated by the current game play. The play time is the time spent on the current game play. The user points are points acquired by the player as a result of the current game play. The team points are points acquired by the team as a result of the current game play. The player-versus-CPU clear time is the time required for the player to clear the current player-versus-CPU mode. The player-versus-CPU clear time is set to "0" when the current player-versus-CPU mode has not been cleared.

The charging session ID is the charging session ID that has been transmitted from the server system 10 to the game device 20 together with the user data (see FIG. 5B) and stored in the charging session ID storage section 158 shown in FIG. 4. In this embodiment, the game result data and the charging session ID that is linked to the game result data are transmitted from the game device 20 to the server system 10 during the save process.

When the server system 10 has received the game result data, the server system 10 transmits a process result (response data) code to the game device 20 (see FIG. 5E). The process result shown in FIG. 7B is a code that indicates the result of the process (game result data reception process). The game device 20 repeatedly transmits the game result data via background communication (described later) or the like until the server system 10 succeeds in receiving the game result data.

As shown in FIG. 5E, the server system 10 performs the charging process for the load process shown in FIG. 5B and the save process shown in FIG. 5D. For example, the server system 10 performs the charging process for both of the load process and the save process, or performs the charging process for one of the load process and the save process. For example, the server system 10 performs the charging process using the charging session ID that has been transmitted from the server system 10 and stored in the game device 20 (see FIG. 5B), and transmitted (returned) from the game device 20 to the server system 10 (see FIG. 5D). Specifically, the server system 10 specifies the charging session based on the charging session ID, and performs the charging process for the specified charging session. For example, the game operating entity in which the game device 20 is installed is charged a higher fee as the number of charging sessions increases.

As a comparative example of this embodiment, the game operating entity may be charged an amount equal to several percent of the sales (i.e., the number of coins inserted) of the game device 20. However, since the utilization rate of the network game differs depending on the game operating entity, the operator of the game operating entity may not agree with the charging system.

If the game operating entity is charged for the communication time or the data traffic of the network game, the load imposed by the communication time measurement process or the network connection process increases. Moreover, the load imposed by the charging process also increases.

According to this embodiment, since the charging process is performed for the load process or the save process, a fair charging system based on the network utilization state can be implemented. Specifically, since the game operating entity is charged for the network service that loads the user data or saves the game result data via the network, a game operating entity that does not frequently utilize the network service is charged less than a game operating entity that frequently utilizes the network service, so that a fair charging system can be implemented.

Since it suffices that the charging process merely count the load process (charging start time) or the save process (charging end time), the load imposed by the charging process can be significantly reduced.

As shown in FIGS. 5A to 5E, the server system 10 waits for arrival of a process request from the game device 20 (client). When the server system 10 has received a request, the server system 10 performs the process (e.g., load process or save process) designated by the request, and returns a response to the game device 20. After completion of the process, the server system 10 waits for arrival of the next request. This makes it unnecessary for the server system 10 to always communicate with (poll) the game device 20. For example, the server system 10 need not perform data communication with the game device 20 during a period before the game starts (FIG. 5A) or a period in which the game device 20 performs the game process (FIG. 5C). Therefore, the load imposed by the communication process can be significantly reduced.

4.2 Reception Failure

When one device has transmitted data to another device via network communication, the other device may fail to receive the data. For example, such reception failure may frequently occur when the data traffic over the network is large.

In FIG. 8B, the game device 20 has failed to receive data transmitted from the server system 10 during the load process. In this case, if the game device 20 again performs the request process and repeats communication until the game device 20 succeeds in receiving the user data, the game process shown in FIG. 8C is delayed. Therefore, the player must wait for the game device 20 to succeed in receiving the user data so that smooth game play cannot be implemented.

In FIG. 8E, the server system 10 performs the charging process for only the save process shown in FIG. 8D without performing the charging process for the load process shown in FIG. 8B. Specifically, when the game device 20 has failed to receive the user data (see FIG. 8B), the game device 20 performs the game process using the user data stored in the IC card 194 (player's storage device) possessed by the player (see FIG. 8C). For example, the user data and the like are stored in the IC card 194 each time the player plays the game. Therefore, the user data that was updated earlier than the user data stored in the game data storage section 242 of the server system 10 is stored in the IC card 194. The game device 20 performs the game process using the user data that was updated earlier than the user data stored in the game data storage section 242. In this case, when the player has purchased an item (e.g., equipment) via the web service utilizing the mobile phone 64 shown in FIG. 2 immediately before the current game play, the character is not equipped with the item during the current game play. However, since the character is equipped with the items that have been purchased before the preceding game play, game play is not affected to a large extent, and smooth game play can be implemented.

When the server system 10 has failed to receive the game result data during the save process shown in FIG. 8D, the game device 20 repeatedly transmits the game result data until the server system 10 succeeds in receiving the game result data. Specifically, the game device 20 repeatedly transmits the game result data via background communication during attraction display.

The game device 20 determines whether or not the server system 10 has succeeded in receiving the game result data based on the process result code shown in FIG. 8E. Specifically, the game device 20 determines that the server system 10 has succeeded in receiving the game result data when a proper process result code has been returned from the server system 10 (see FIG. 8E), and determines that the server system 10 has failed to receive the game result data when a proper process result code has not been returned from the server system 10.

In FIG. 9B, the server system 10 generates the charging session ID during the load process, and stores the generated charging session ID and the charging start time (charging session start time or load process execution time) in the game data storage section 24. The server system 10 transmits the user data stored in the game data storage section 242 and the generated charging session ID to the game device 20.

As shown in FIG. 9D, when the server system 10 has received the corresponding charging session ID from the game device 20 during the save process, the server system 10 stores the game result data and the charging end time (charging session end time or save process execution time) in the game data storage section 24.

As shown in FIG. 9E, the charging section 220 performs the charging process using the charging session ID that has been received in FIG. 9D. Specifically, the charging section 220 specifies the number of charging sessions for each game operating entity based on the number of charging session IDs corresponding to each game operating entity, and charges the game operating entity a higher fee as the number of charging sessions increases. According to this configuration, since the amount charged of the account can be specified by merely counting the number of charging session IDs, the load imposed by the charging process can be significantly reduced.

When the game device 20 has failed to receive the user data (see FIG. 10B) and performs the game process based on the user data from the IC card 194 (see FIG. 10C), the game device 20 has also failed to receive the charging session ID. Therefore, it is necessary to take measures to implement the charging process using the charging session ID.

In FIG. 10D, the game device 20 transmits a temporary charging session ID that is linked to the game result data to the server system 10 during the save process when the game device 20 has failed to receive the charging session ID. The temporary charging session ID is an ID that is set to a given code that is not used for a normal charging session ID.

When the server system 10 has received the temporary charging session ID, the server system 10 stores the game result data and the charging end time (i.e., the reception time of the temporary charging session ID) in the game data storage section 242. As shown in FIG. 10E, the server system 10 generates a new charging session ID, and performs the charging process. Specifically, when the server system 10 has received the temporary charging session ID, the server system 10 regards charging as having started (load) and ended (save) at the same time, generates a new charging session ID, and performs the charging process based on the generated new charging session ID. For example, the server system 10 counts the charging end time, and performs the charging process.

Figure 11A:
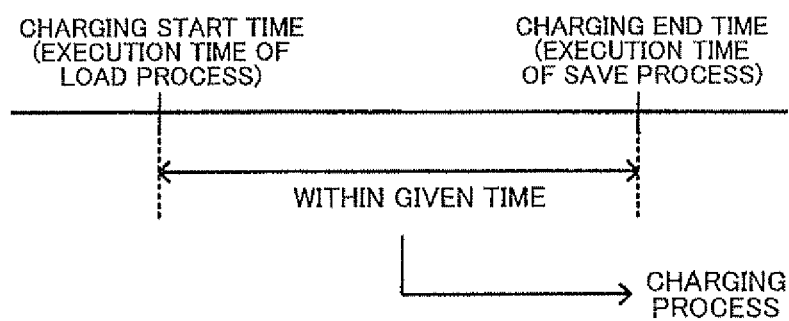
FIGS. 11A and 11B are views illustrative of a charging process.

In FIG. 11A, the charging section 220 performs the charging process on condition that the difference between the charging start time due to the load process (i.e., the execution time of the load process in a broad sense) and the charging end time due to the save process (i.e., the execution time of the save process in a broad sense) is within a given time. For example, it is estimated that the charging session is not normal when the difference between the charging start time and the charging end time is not within 24 hours. In this case, the charging section 220 determines that the charging session is not normal, and does not perform the charging process.

Specifically, when the game device 20 has failed to receive the user data (see FIG. 10B) and transmitted the temporary charging session ID (see FIG. 10D), the server system 10 cannot acquire (specify) the charging start time of the charging session. On the other hand, the server system 10 can set the reception time of the temporary charging session ID to be the charging end time.

Figure 11B:
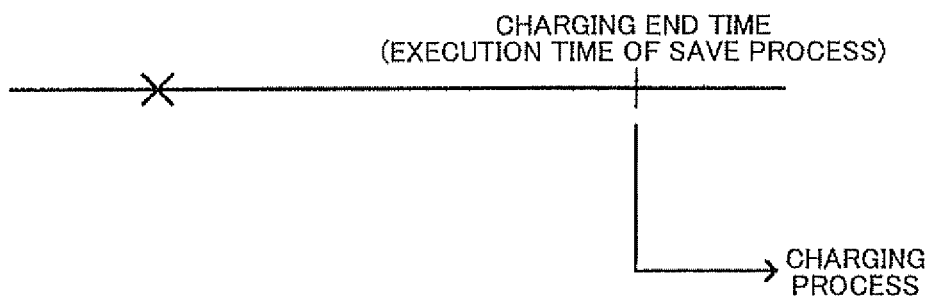

As shown in FIG. 11B, the server system 10 performs the charging process when the charging end time (i.e., the execution time of the save process) has been acquired, even if the charging start time (i.e., the execution time of the load process) has not been acquired. According to this configuration, even if the game device 20 has failed to receive the user data and issued the temporary charging session ID, the charging session can be normally terminated to implement the charging process.

4.3 Charging Data

The charging data generated by the charging section 220 according to this embodiment is described below. The charging section 220 generates the charging session data and the total charging data as the charging data for charging the game operating entity.

Specifically, the charging section 220 generates the charging session data that includes the charging session ID and the charging information that is linked to the charging session ID. The charging information may include at least one of the charging start time (i.e., the execution time of the load process) and the charging end time (i.e., the execution time of the save process). If the charging session data includes the charging start time and the charging end time, the charging time can be specified.

FIG. 12A shows a specific data configuration example of the charging session data. A reception day is the day when the charging data (charging session data) is generated. A game ID and a game sub-ID are an ID and a sub-ID that identify the game that is implemented by the game device. A service type is a code that indicates a game mode and the like. A charging start time is the time when the charging target game started. A charging end time is the time when the charging target game ended. For example, the time is measured when the charging section 220 has received the user data request from the game device 20 and started the process, and recorded as the charging start time. The time is measured when the charging section 220 has received the personal data (game result data), and recorded as the charging end time. A process flag is a flag that indicates whether or not the charging data has been totaled. A last update time is the time when the record was last updated. In FIG. 12A, the charging information is linked to the charging session ID that uniquely identifies each charging session.

The charging section 220 generates the total charging data that includes the game operating entity ID and the charging count information due to at least one of the load process and the save process. If the total charging data includes the game operating entity ID and the charging count information, it is possible to simply specify and indicate charging so that the amount charged increases as the charging count increases.

FIG. 12B shows a specific data configuration example of the total charging data. A reception day is the day when the charging data is totaled. A sales day is the day when the charging data is generated. A charging code is a code that indicates the charging mode of the charging session. A service code is a code that indicates the service type of the charging session. A charging start count (charging count information) is the number of charging sessions for which charging started validly. A charging end count (charging count information) is the number of charging sessions for which charging ended validly. A last update time is the time when the record was last updated.

4.4 Detailed Process

A flow of the detailed process of the server system 10 according to this embodiment is described below.

FIG. 13A shows a flow of a process that registers the game device 20 (board). The server system 10 receives a request from the game device 20 (A1). The server system 10 compares the game device ID and the game operating entity ID received from the game device 20 with the information stored in the game data storage section 242 (database). The server system 10 registers the game device 20 when the game device 20 has not been registered, and does not register the game device 20 when the game device 20 has been registered (A2). The server system 10 updates the last access date of the game device 20 (A3). The server system 10 returns a communication interval control parameter and a request process result code, and finishes the process (A4).

FIG. 13B shows a flow of a process that loads (transmits) the user data. The server system 10 receives a request from the game device 20 (B1). The server system 10 acquires the user data (character information) from the game data storage section 242 based on the character DBID included in the received request (B2). The server system 10 generates the charging session ID, and registers the charging session ID in the charging server (charging section) together with the charging information (charging start time=current time of the server) (B3). When the card ID that has been transmitted from the game device 20 differs from the card ID stored in the game data storage section 242, the server system 10 corrects the card data stored in the game data storage section 242 (B4). The server system 10 returns the user data, the charging session ID, and the process result code, and finishes the process (B5).

FIG. 13C shows a flow of a process that registers a new card. The server system 10 receives a request from the game device 20 (board) (C1). The server system 10 compares the received card ID with the information stored in the game data storage section 242. When the IC card is in use (used), the server system 10 returns an error (C2). When the card has not been used, the server system 10 reserves a new character data storage area, and issues a character DBID (C3). The server system 10 generates the charging session ID, and registers the charging session ID in the charging server together with the charging information (charging start time=current time of the server) (C4). The server system 10 returns the game data (e.g., character DBID), the charging session ID, and the process result code, and finishes the process (C5).

FIGS. 14A and 14B show data structure examples of new card registration data. FIG. 14A shows data that is transmitted from the game device 20 to the server system 10 as indicated by (C1) in FIG. 13C. A fighter ID is the ID of a fighter used in connection with the IC card. A card issuance ID is an ID issued by the client (game device) when a new card is issued.

FIG. 14B shows data that is transmitted from the server system 10 to the game device 20 as indicated by (C5) in FIG. 13C. Item information is information about a default item worn by the character. A charging session ID is a session ID issued by the server system 10. The game device 20 returns the same value when the game has ended.

FIG. 13D shows a flow of a process that saves (transmits) the play data (game result data). The server system 10 receives a request from the game device 20 (D1). The server system 10 converts the play data into various types of data, and stores the data in the game data storage section 242 (D2). Specifically, the server system 10 analyzes the history of the play data, and performs an update process that merges the previous play data with the current play data. The same basic process is performed in the player-versus-player mode, the player-versus-ghost mode, and the player-versus-CPU mode, except that a different request is used. The server system 10 returns the process result code, and finishes the process (D3).

FIGS. 15A and 15B show data structure examples of the play data. FIGS. 15A and 15B show examples of the play data in the player-versus-player mode, and play data having a different structure is used in the player-versus-ghost mode or the player-versus-CPU mode.

FIG. 15A shows data that is transmitted from the game device 20 to the server system 10 as indicated by (D1) in FIG. 13D. A win/loss flag is a flag that indicates whether a player 1P or a player 2P has won the game. A perfect win count is the number of rounds of perfect win, and a great win count is the number of rounds of great win. A high attack count is the total number of high attack movements successfully made by the player, a high guard count is the total number of high guard movements successfully made by the player, a middle attack count is the total number of middle attack movements successfully made by the player, and a middle guard count is the total number of middle guard movements successfully made by the player. The play data thus indicates the game result data.

FIG. 15B shows data that is transmitted from the server system 10 to the game device 20 as indicated by (D3) in FIG. 13D. A process result is a code that indicates the result of the process (play data reception process).

FIG. 16A shows a flow of a process that saves (transmits) the personal data (game result data). The server system 10 receives a request from the game device 20 (E1). The server system 10 converts the received personal data into various types of data, and stores the data in the game data storage section 242 (E2). Specifically, the server system 10 analyzes the history of the personal data, and performs an update process that merges the previous personal data with the current personal data. The server system 10 registers completion of the charging session in the charging server based on the charging session ID (E3). The server system 10 returns the process result code, and finishes the process (E4).

FIG. 16B shows a flow of a process that checks the patch version. The server system 10 receives a request from the game device 20 (F1). The server system 10 checks whether or not a patch that has a patch version number larger than the patch version number transmitted from the game device 20 has been provided, based on the information stored in the game data storage section 242 (F2). When a patch that has a patch version number larger than the patch version number transmitted from the game device 20 has been provided, the server system 10 returns the patch version number and the process result code, and finishes the process (F3).

FIG. 16C shows a flow of a process that loads (transmits) the patch data. The server system 10 receives a request from the game device 20 (G1). The server system 10 reads the designated patch data from the game data storage section 242 (G2). The server system 10 returns the process result code and the patch data read from the game data storage section 242, and finishes the process (G3). The patch data is data that updates the game program to the latest version.

FIG. 17A shows a flow of a process that checks replay data and play history data. The server system 10 receives a request from the game device 20 (H1). The server system 10 checks whether or not replay data (play history data) that can be provided to the game device 20 is present in addition to replay data included in a replay data list (play history data list) transmitted from the game device 20 (H2). The replay data list (play history data list) is a list of replay data (play history data) that is currently possessed by the game device 20. When replay data (play history data) that can be provided to the game device 20 is present, the server system 10 copies the replay data (play history data) into a download cache area (H3). The server system 10 returns the process result code and the ID of the replay data (play history data) that can be provided to the game device 20, and finishes the process (H4).

FIG. 17B shows a flow of a process that loads (transmits) the replay data (play history data). The server system 10 receives a request from the game device 20 (I1). The server system 10 checks whether or not the ID of the requested replay data (play history data) coincides with the ID of the replay data (play history data) provided in the download cache area (I2). The server system 10 acquires the replay data (play history data) from the download cache area (I3). The server system 10 returns the replay data (play history data) and the process result code, and finishes the process (I4).

The play history data is ghost data. A ghost character operated based on the ghost data is roughly classified as a ghost character that faithfully reproduces the game play of the player based on the play record (operation data record) of the player, or a ghost character that moves along the play tendency of the player based on the play record of the player and a computer-controlled routine.

FIG. 17C shows a flow of a process that checks the ranking data. The server system 10 receives a request from the game device 20 (J1). The server system 10 searches the version ID of the ranking data that is currently provided (J2). The server system 10 returns the process result code and the version ID of the ranking data that is currently provided, and finishes the process (J3).

FIG. 17D shows a flow of a process that acquires the ranking data. The server system 10 receives a request from the game device 20 (K1). The server system 10 acquires the requested ranking data from the game data storage section 242 (K2). The server system 10 returns the ranking data and the process result code, and finishes the process (K3).

FIG. 18A shows a flow of a process that acquires the advertisement information. The server system 10 receives a request from the game device 20 (L1). The server system 10 acquires the requested advertisement information about the game operating entity (store) from the game data storage section 242 (L2). The server system 10 returns the advertisement information and the process result code, and finishes the process (L3).

The advertisement information (spot information) is information for the operator of the game operating entity to inform the user of information (e.g., "We are holding an event" or "A tournament will be held on the weekend."). The operator of the game operating entity can set the advertisement information via the web service that utilizes the mobile phone 64 shown in FIG. 2, for example. The advertisement information is displayed on the monitor of the game device 20 or the relay device 18 as spot information.

FIG. 18B shows a flow of a process that acquires the telop data. The server system 10 receives a request from the game device 20 (M1). The server system 10 acquires telop data that has a version number larger than the transmitted version number of the telop data that is currently stored in the game device 20 (M2). The server system 10 returns the acquired telop data and the process result code, and finishes the process (M3).

FIG. 18C shows a flow of a process that registers the telop data. The server system 10 receives a request from the game device 20 (N1). The server system 10 registers the telop data transmitted from the game device 20 in the game data storage section 242 (N2). The server system 10 returns the process result code, and finishes the process (N3).

The telop data is data that notifies other players via a special flash that the grade of the character of the player who participates in the network game has reached or exceeded a given grade, for example. The telop data is displayed on the monitor of the relay device 18, for example.

FIG. 19A shows a flow of a process that prepares to save the replay data (play history data). The server system 10 receives a request from the game device 20 (P1). The server system 10 reserves an upload cache area for receiving the designated replay data (play history data) (P2). The server system 10 returns the upload cache ID and the process result code, and finishes the process (P3).

FIG. 19B shows a flow of a process that saves the replay data (play history data). The server system 10 receives a request from the game device 20 (Q1). The server system 10 saves a fragment (transfer unit data) of the replay data (play history data) in the upload cache area (Q2). When all of the fragments of the replay data have been provided, the server system 10 combines the fragments to generate replay data (play history data), and stores the replay data (play history data) in the game data storage section 242 (Q3). The server system 10 returns the process result code, and finishes the process (Q4).

4.5 Charging Rate

Figures 20A, 20B, 20C:
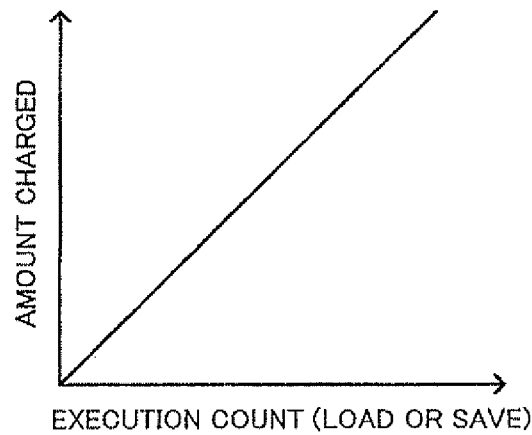
FIG. 20A to 20C are views illustrative of a charging rate change method.

In this embodiment, the charging process is performed so that the game operating entity is charged a higher fee as the execution count of at least one of the load process and the save process increases, as shown in FIG. 20A. For example, the amount charged is determined by multiplying the execution count by a given multiplication coefficient. The execution count is the charging start count or the charging end count included in the total charging data shown in FIG. 12B.

According to the configuration shown in FIG. 20A, the amount charged is determined based on the execution count of the load process or the save process (i.e., network service). Therefore, the game operating entity is charged a higher fee as the number of times that the game device installed in the game operating entity utilizes the network service increases, so that a fair charging system can be implemented. Moreover, since the amount charged can be determined by merely counting the execution count, the load imposed by the charging process is low.

However, it may be impossible to deal with various situations and demands of the game operating entity by such a simple charging process. In this case, the charging rate for the execution count is variably changed, for example. When the amount charged is indicated by "K×execution count", K (i.e., charging rate) is changed based on various factors. Alternatively, the execution count is increased or decreased corresponding to the charging rate.

In FIG. 20B, the time zone in which the player played the game using the game device is specified, for example. The charging rate is changed based on the specified time zone.

Specifically, the charging rate is set based on a table in which the time zone is linked to the charging rate (see FIG. 20B).

For example, the charging rate is decreased in the morning time zone (6:00 to 12:00), and increased in the night time zone (18:00 to 24:00). Therefore, since the game operating entity is charged a lower fee in the morning time zone in which the game device utilization rate is low, the burden on the game operating entity can be reduced. On the other hand, the network utilization rate of the game device installed in the game operating entity can be suppressed by increasing the charging rate in the night time zone in which the utilization ratio of the game device is high, so that the load imposed on the network in the busy time zone can be reduced.

The time zone in which the player played the game may be specified based on the charging start time or the charging end time shown in FIG. 12A, for example. Specifically, the charging start time is specified based on the user data transmission timing shown in FIG. 9B, and the charging end time is specified based on the game result reception timing shown in FIG. 9D. The time zone in which the player played the game is specified based on at least one of the charging start time and the charging end time. According to this configuration, the charging rate for the charging can be changed by a simple process by effectively utilizing the charging start time or the charging end time included in the charging session data shown in FIG. 12A. Note that the time zone in which the player played the game may be specified based on information received from the game device.

In FIG. 20C, sales result information about the game operating entity is acquired based on information received from the game device. The charging rate is changed based on the acquired sales result information. Specifically, the charging rate is set based on a table in which sales are linked to the charging rate (see FIG. 20C).

For example, the charging rate is decreased for a game operating entity with a small sale, and increased for a game operating entity with a large sale. According to this configuration, a charging process that takes account of the sales of the game operating entity can be implemented so that it is possible to deal with the situation and the demand of the game operating entity. The sales result information about the game operating entity may be specified by monitoring the number of coins inserted into each game device or the like via the network. This makes it possible to change the charging rate while determining the sales result information by effectively utilizing the network.

Figures 21A, 21B:
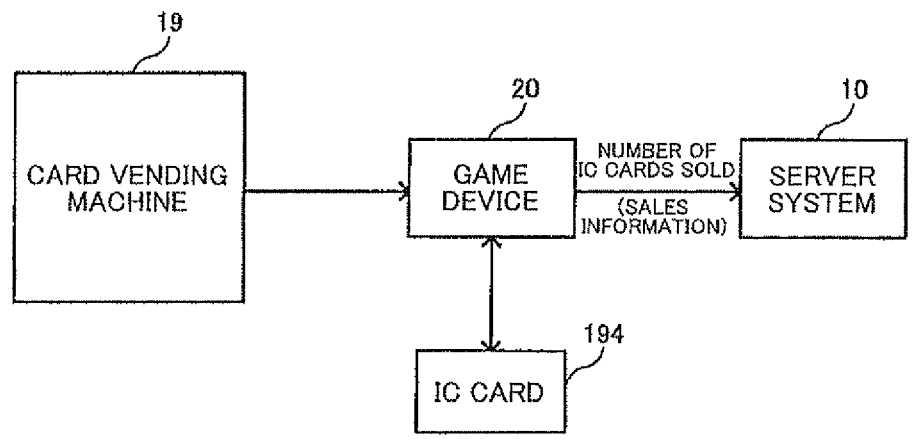
FIGS. 21A and 21B are views illustrative of a charging rate change method.

In FIG. 21A, the game device 20 performs the game process based on the data (e.g., user data) stored in the IC card 194 (player's storage device) possessed by the player. A card vending machine 19 that sells the IC card 194 is installed in the game operating entity, and communicably connected to the server system 10 via the game device 20 and the network, for example. Therefore, the server system 10 can acquire the IC card sales information (e.g., the number of IC cards sold) about the game operating entity based on information received by the reception section 215. The charging section 220 (charging rate change section 224) changes the charging rate based on the acquired sales information. Specifically, the charging section 220 sets the charging rate based on a table in which the number of cards sold is linked to the charging rate (see FIG. 21B).

This makes it possible to decrease the charging rate preferentially for a game operating entity that sold a large number of cards. Specifically, the amount charged is reduced or exempted when the game operating entity sold a large number of cards. This makes it possible to prompt the operator of the game operating entity to sell a large number of cards so that the number of users who play the network game increases.

4.6 Charging for Replay Data Load Process, Etc.

An example in which the game operating entity is charged for the user data load process or the game result data save process has been described above. Note that the charging target load process is not limited thereto. For example, the charging process may be performed for the load process that loads the replay data, the play history data, the ranking data, or the advertisement information. It is also possible to perform the charging process for the load process that loads the patch data or the telop data.

Figure 22A:
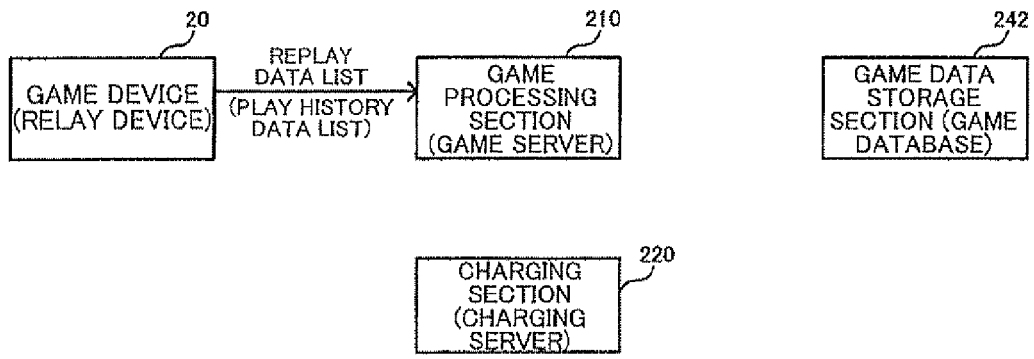
FIGS. 22A to 22C are views illustrative of a charging process performed for a replay data load process, etc.

In FIG. 22A, the game device 20 transmits the replay data list (play history data list) to the server. The server can identify the replay data that has been loaded into the game device 20 based on the replay data list.

Figure 22B:
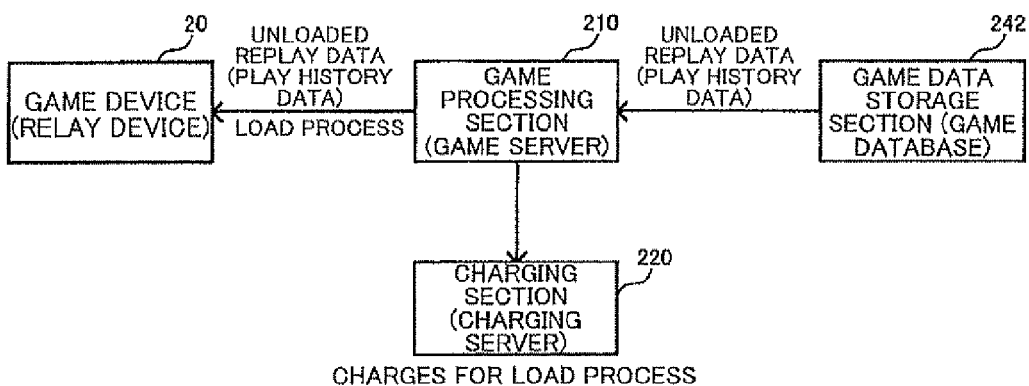

In FIG. 22B, the game processing section 210 (transmission section) transmits the replay data (play history data) to the game device 20 (relay device). Specifically, the game processing section 210 transmits unloaded replay data (unloaded play history data) other than the replay data that has been loaded into the game device 20 (relay device) to the game device 20 (relay device). The unloaded replay data can be determined based on the replay data list received in FIG. 22A.

The charging section 220 performs the charging process for the load process that transmits the replay data (play history data) to the game device 20 (relay device). For example, the charging section 220 performs the charging process so that the amount charged increases as the execution count of the replay data (play history data) load process increases.

This makes it possible to charge the game operating entity for the network service that loads the replay data or the play history data. Specifically, it is possible to charge the game operating entity for the network service so that a fairer and more appropriate charging process can be implemented.

Figure 22C:
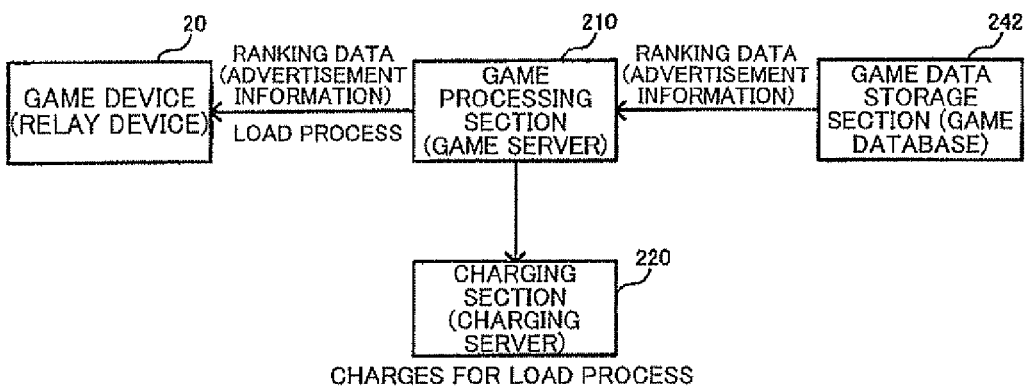

In FIG. 22C, the transmission section 214 of the game processing section 210 transmits the ranking data (advertisement information about the game operating entity) to the game device 20 (relay device). In this case, the charging section 220 performs the charging process for the load process that transmits the ranking data (advertisement information) to the game device (relay device). For example, the charging section 220 performs the charging process so that the amount charged increases as the execution count of the ranking data (advertisement information) load process increases.

This makes it possible to charge the game operating entity for the network service that loads the ranking data or the advertisement information so that a fairer and more appropriate charging process can be implemented.

4.7 Background Communication

Figure 23:
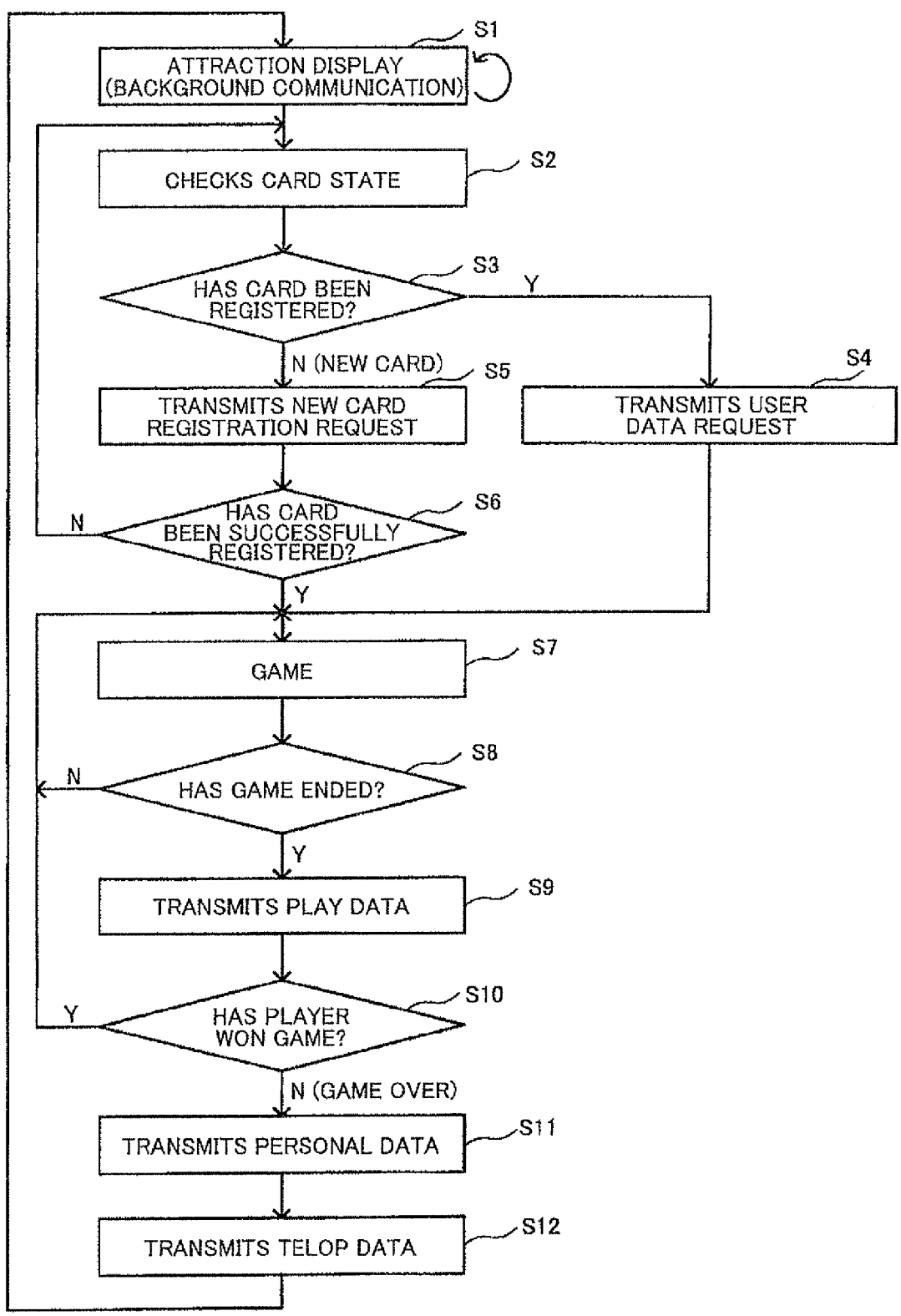
FIG. 23 is a flowchart illustrative of a process performed by a game device.
Figure 24:
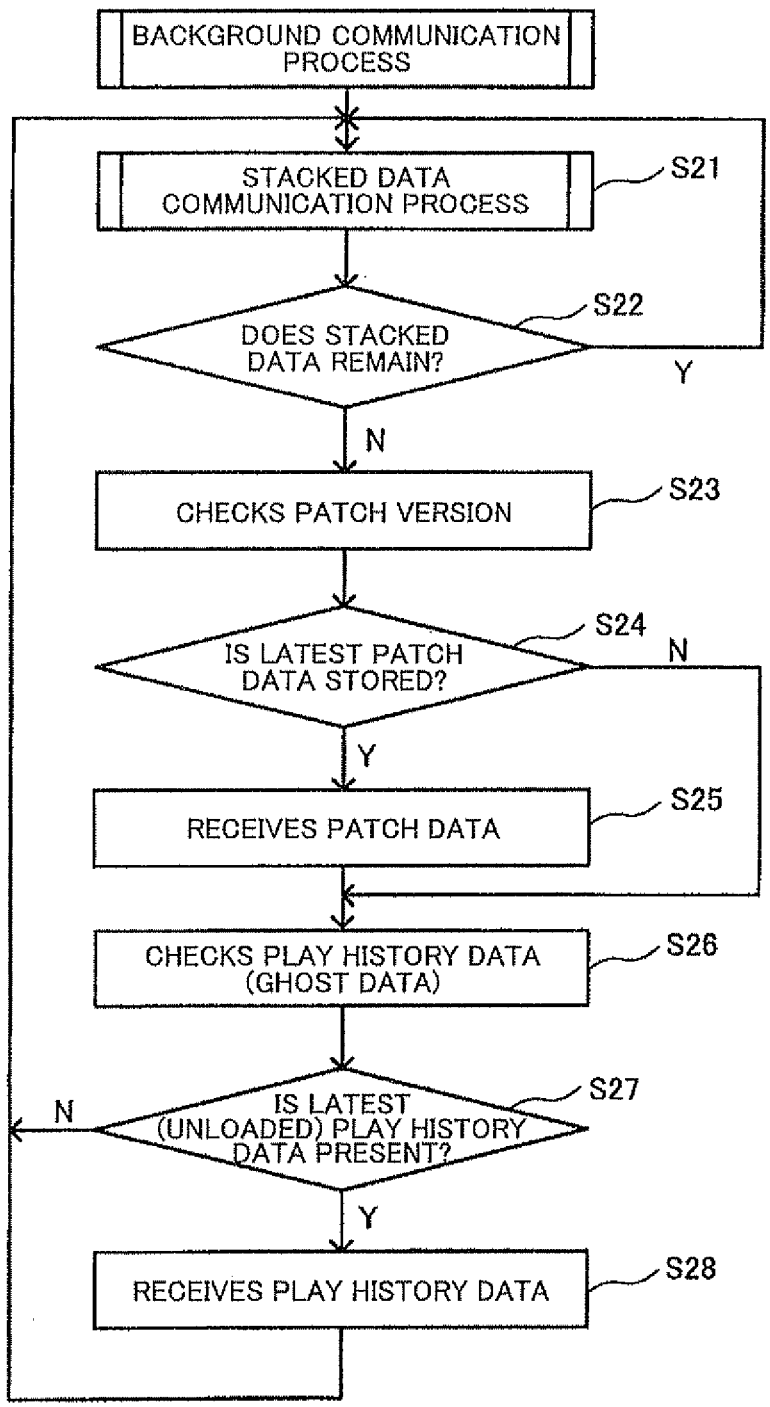
FIG. 24 is a flowchart illustrative of a background communication process.
Figure 25:
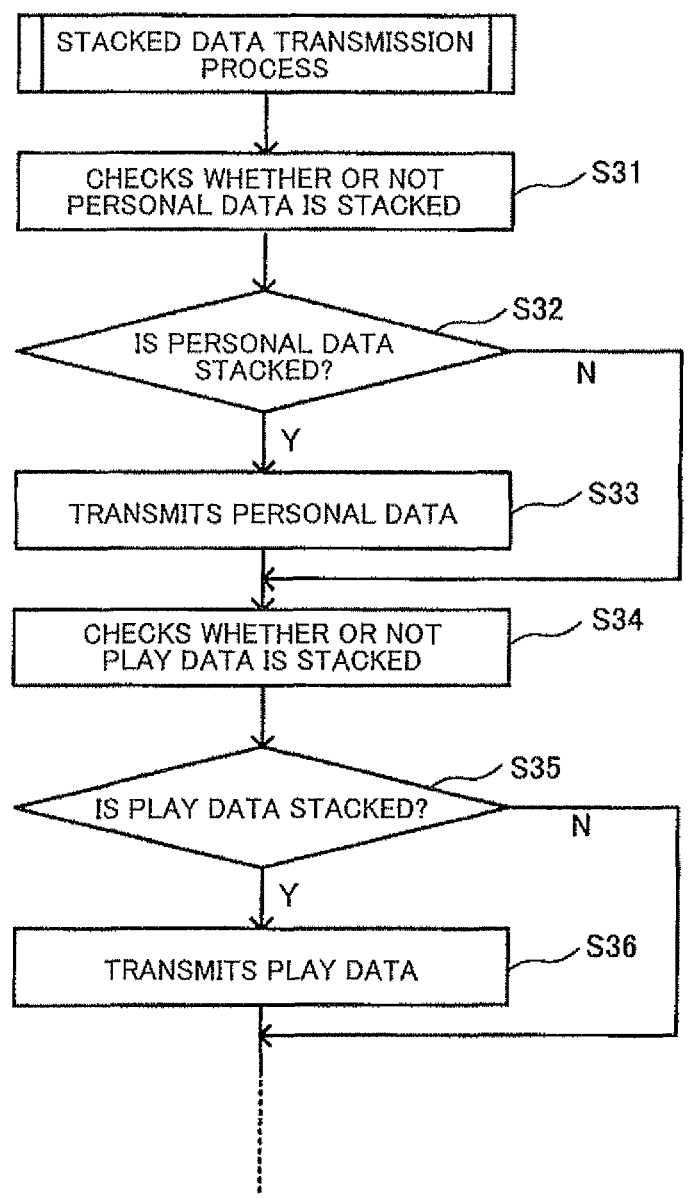
FIG. 25 is a flowchart illustrative of a stacked data transmission process.

FIGS. 23 to 25 are flowcharts illustrative of the details of the process performed by the game device 20.

FIG. 23 is a flowchart illustrative of the overall process of the game device 20. Note that FIG. 23 shows a flow when all of the players play the game using the IC card for convenience of description.

An attraction screen is displayed on the display section 190 of the game device 20 when the player does not play the game (step S1). A background communication (described later) or the like is performed in the attraction display period.

When the player has inserted a coin into the game device 20, or inserted the IC card 194 into the card insertion section of the game device 20, the game device 20 checks the state of the card (step S2). The game device 20 determines whether or not the inserted IC card 194 has been registered (step S3).

When the inserted IC card 194 has been registered, the game device 20 transmits the user data request (see FIG. 5A) (step S4). The game device 20 then starts the game process, and the player starts playing the game (step S7). When the inserted IC card 194 has not been registered, the game device 20 transmits the new card registration request (see FIG. 13C) (step S5). When the IC card 194 has been successfully registered, the game device 20 then starts the game process (steps S6 and S7). When the IC card 194 has not been successfully registered, the game device 20 returns to the step S2.

When the game has ended, the game device 20 transmits the play data (see FIG. 13D) (step S9). The game device 20 determines whether or not the player has won the game (step S10). When the player has won the game, the game device 20 returns to the step S7, and starts the game process. When the player has lost the game (game over), the game device 20 transmits the personal data (game result data) (see FIGS. 5D and 16A) (step S11). The game device 20 then transmits the telop data, and returns to the step S1 (attraction display).

FIG. 24 is a flowchart showing the background communication process performed in the step S1 shown in FIG. 23. In the background communication process, the game device 20 transmits the stacked data (step S21). The game device 20 determines whether or not the stacked data remains (step S22). When the stacked data remains, the game device 20 returns to the step S21, and repeatedly transmits the stacked data until the stacked data does not remain.

When the game device 20 has transmitted all of the stacked data, the game device 20 checks the patch version (see FIG. 16B) (step S23). When the latest patch data is stored in the server, the game device 20 receives the patch data (see FIG. 16C) (step S25).

The game device 20 then checks the play history data (see FIG. 17A) (step S26). When the latest (unloaded) play history data is present, the game device 20 receives the play history data (see FIG. 17B) (steps S27 and S28).

FIG. 25 is a flowchart shown in the stacked data transmission process in the step S21 shown in FIG. 24. The game device 20 checks whether or not the personal data is stacked (step S31). When the personal data is stacked, the game device 20 transmits the stacked personal data (steps S32 and S33). The game device 20 then checks whether or not the play data is stacked (step S34). When the play data is stacked, the game device 20 transmits the stacked play data (steps S35 and S36). The game device 20 similarly transmits stacked play history data, telop data, and replay data.

According to this embodiment, when the transmission section 106 of the game device 20 has failed to transmit the game result data (e.g., personal data or play data), the transmission section 106 stacks the game result data. The transmission section 106 transmits the stacked game result data to the server system 10 via background communication described with reference to FIGS. 24 and 25.

For example, when stacking and retransmitting the user data when having failed to receive the user data (see FIG. 8B), the player must wait for transmission (communication) to succeed so that a smooth game process cannot be implemented.

On the other hand, the game has ended when transmitting the game result data. Therefore, the game result data save process can be implemented without causing the player to wait for the process to succeed by transmitting the game result data to the server system 10 via background communication by effectively utilizing the attraction display period after the game has ended. In this case, a proper charging process can be implemented even when having failed to receive the user data by performing the charging process for only the save process, as described with reference to FIGS. 8E and 11B.

4.8 Restriction on Removal of IC Card

Figure 26A:
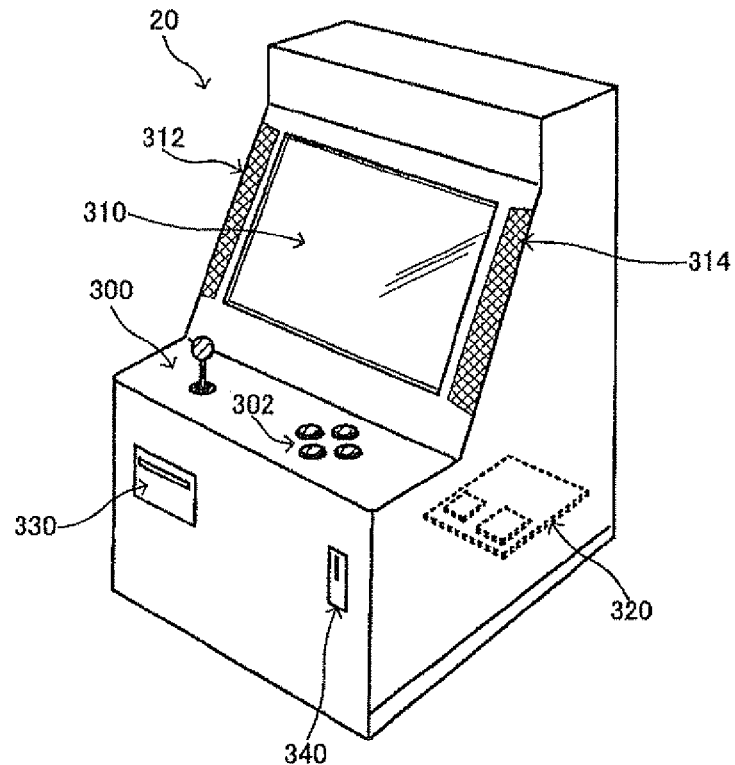
FIG. 26A to 26C are views illustrative of an IC card removal restriction method.

FIG. 26A is an external view showing the game device 20. An operation lever 300 and an operation button 302 form the operation section 130 shown in FIG. 4. A display 310 forms the display section 190, and speakers 312 and 314 form the sound output section 192. A game board 320 (circuit board) is provided with ICs such as a processor that implements the processing section 100, a RAM that implements the storage section 140, and a ROM that implements the information storage medium 180.

A card reader-writer 330 forms the I/F section 193 shown in FIG. 4. A coin insertion section 340 allows the player to insert a coin. The player can play the game by inserting a coin into the coin insertion section 340.

Figure 26B:
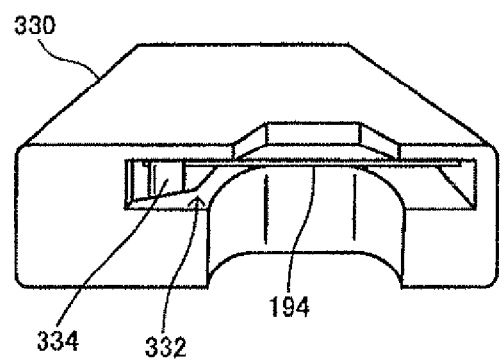
Figure 26C:
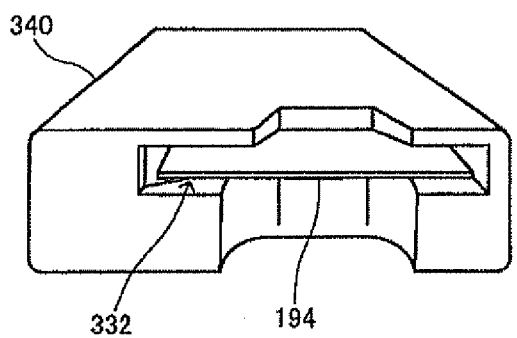

FIG. 26B shows an example of the card reader-writer 330. The card reader-writer 330 includes a card insertion slot 332. The player inserts the IC card 194 into the card insertion slot 332. The card insertion slot 332 is provided with a restriction member 334 (pin) that restricts removal (discharge) of the IC card 194. Specifically, when removal of the IC card 194 is restricted as shown in FIG. 26B, the restriction member 334 protrudes upward so that the player cannot remove the IC card 194, for example. When the restriction member 334 has moved downward (see FIG. 26C), the player can remove the IC card 194, for example.

In this embodiment, removal of the IC card 194 is restricted by the restriction member 334 until the game result data (game data) is completely written into the IC card 194 after the player has finished playing the game. For example, if the IC card 194 is removed before the game result data is completely written into the IC card 194, the write data may not be normally reflected in the IC card 194. In this embodiment, since the charging process is performed for the game result data save process, a proper charging process may not be performed if such a situation has occurred.

However, occurrence of such a situation can be prevented by restricting removal of the IC card 194 as shown in FIG. 26B, so that a proper charging process can be implemented.

Although some embodiments of the invention have been described in detail above, those skilled in the art would readily appreciate that many modifications are possible in the embodiments without materially departing from the novel teachings and advantages of the invention. Accordingly, such modifications and combinations of such modifications are intended to be included within the scope of the invention. Any term (e.g., IC card, mobile phone, charging start time, and charging end time) cited with a different term (e.g., player's storage device, portable communication terminal, execution time of load process, and execution time of save process) having a broader meaning or the same meaning at least once in the specification and the drawings can be replaced by the different term in any place in the specification and the drawings. The load process, the save process, the charging process, and the like are not limited to those described in connection with the above embodiments. Methods equivalent to the above methods are included within the scope of the invention.

What is claimed is:

1. A server system that is communicably connected to a game device that is installed in a game operating entity, the server system comprising:
    a memory; and
        at least one processor that is configured to:
            perform at least one of a load process and a save process, the load process reading from the server system user data about a player who plays a game using the game device installed in the game operating entity and transmitting the user data to the game device before the player starts playing the game, the save process receiving game result data about the player obtained by the game device from the game device after the player has finished playing the game and writing the received game result data to the server system; and perform a charging process that charges the game operating entity for at least one of the reading from the server system during the load process and the writing to the server system during the save process, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

2. The server system as defined in claim 1,
the user data including at least one of: past game result information about the player, past game result information about a team of the player, game play history information about the player, growth information, experience value information, and equipment information.

3. The server system as defined in claim 1,
the game result data including at least one of: game result information about current game play of the player, game result information about current game play of a team of the player, game play history information about the current game play of the player, growth information updated by the current game play, and experience value information updated by the current game play.

4. The server system as defined in claim 1, wherein
performing the charging process comprises performing the charging process for the save process without performing the charging process for the load process.

5. The server system as defined in claim 4, wherein
the processor is further configured to perform a game process using user data stored in a player's storage device when the game device has failed to receive the user data transmitted from the server system; and
performing the charging process for the save process that receives game result data obtained by the game process and writes the game result data to the server system.

6. The server system as defined in claim 1,
the processor further configured to perform the charging process on condition that the difference between an execution time of the load process and an execution time of the save process is within a given time.

7. The server system as defined in claim 6,
the processor further configured to perform the charging process when the execution time of the save process has been acquired, even if the execution time of the load process has not been acquired.

8. The server system as defined in claim 1, the processor further configured to:
transmit the user data and charging session identification information that is linked to the user data to the game device during the load process;

receive the game result data and the charging session identification information that is linked to the game result data from the game device during the save process; and
performing the charging process using the received charging session identification information.

9. A server system that is communicably connected to a game device that is installed in a game operating entity, the server system comprising:
a memory; and
at least one processor that is configured to:
perform a load process and a save process, the load process reading user data from the server system about a player who plays a game using the game device installed in the game operating entity and transmitting the user data and charging session identification information that is linked to the user data to the game device before the player starts playing the game, the save process receiving the charging session identification information and game result data about the player obtained by the game device from the game device after the player has finished playing the game and writing the received game result data to the server system; and
perform a charging process that charges the game operating entity using the received charging session identification information, wherein:
the user data comprises at least one of: a team ID, a team name, a grade ID, an experience value, a team emblem ID, a title ID, a player-versus-player win count, a player-versus-player loss count, a mobile member determination flag, and team points; and
the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

10. The server system as defined in claim 9, wherein:
the game device transmits temporary charging session identification information that is linked to the game result data to the server system during the save process when the game device has failed to receive the charging session identification information transmitted from the server system;
the charging process generating new charging session identification information indicating that charging started and ended at the same time when the server system receives the temporary charging session identification information; and
performing the charging process based on the generated new charging session identification information.

11. The server system as defined in claim 9,
the charging process generating charging session data as charging data for charging the game operating entity, the charging session data including the charging session identification information and charging information that is linked to the charging session identification information.

12. The server system as defined in claim 11,
the charging process generating the charging session data so that the charging information includes at least one of: an execution time of the load process and an execution time of the save process.

13. The server system as defined in claim 1, the charging process generating total charging data as charging data for charging the game operating entity, the total charging data including identification information about the game operating entity and charging count information about at least one of the load process and the save process.

14. The server system as defined in claim 1, the processor further configured to perform the charging process so that the game operating entity is charged a higher fee as an execution count of at least one of the load process and the save process increases.

15. The server system as defined in claim 14, the charging process including a charging rate change process that variably changes a charging rate based on the execution count.

16. The server system as defined in claim 15, the charging process specifying a time zone in which the player played the game using the game device, and changing the charging rate change process changing the charging rate based on the specified time zone.

17. The server system as defined in claim 15, the charging process acquiring sales result information about the game operating entity based on information received by the server system and the charging rate change process changing the charging rate based on the acquired sales result information.

18. The server system as defined in claim 15, the game device performing a game process based on data stored in a player's storage device; and the charging process further acquiring sales information about the player's storage device in the game operating entity based on information received by the server system and the charging rate change process changing the charging rate based on the acquired sales information.

19. The server system as defined in claim 1, the load process further transmitting replay data or play history data to the game device or a relay device that is installed in the game operating entity; and the processor further configured to perform the charging process for the load process that transmits the replay data or the play history data to the game device or the relay device.

20. The server system as defined in claim 19, the load process further transmitting unloaded replay data or unloaded play history data other than the replay data or the play history data that has been loaded into the game device or the relay device to the game device or the relay device; and the processor further configured to perform the charging process for the load process that transmits the unloaded replay data or the unloaded play history data to the game device or the relay device.

21. The server system as defined in claim 1, the load process further transmitting ranking data or advertisement information about the game operating entity to the game device or a relay device that is installed in the game operating entity; and the processor further configured to perform the charging process for the load process that transmits the ranking data or the advertisement information to the game device or the relay device.

22. A game device that is communicably connected to a server system, the game device comprising:

a memory and at least one processor, the processor configured to:

receive user data from the server system;

perform a game process using the received user data;

transmit game result data obtained by the game process to the server system; and interface between the game device and a player's storage device; and the server system comprising:

a memory and at least one processor that is configured to:

perform at least one of a load process and a save process, the load process reading from the server system the user data about a player who plays a game using the game device installed in the game operating entity and transmitting the user data to the game device before the player starts playing the game, the save process receiving the game result data about the player obtained by the game device from the game device after the player has finished playing the game and writing the received game result data to the server system; and perform a charging process that charges the game operating entity for at least one of the reading from the server system during the load process and the writing to the server system during the save process, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of:

a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

23. The game device as defined in claim 22, the game process using user data stored in the player's storage device when the game device has failed to receive the user data transmitted from the server system.

24. The game device as defined in claim 22, the processor of the game device further configured to stack the game result data when the game device has failed to transmit the game result data to the server system, and transmitting the stacked game result data to the server system via background communication when the game device has failed to transmit the game result data to the server system.

25. The game device as defined in claim 22, the processor further configured to restrict removal of the player's storage device until the game result data is completely written to the player's storage device after the player has finished playing the game.

26. A control method that is implemented by a server system that is communicably connected to a game device that is installed in a game operating entity, the method comprising:

performing at least one of a load process and a save process, the load process reading user data about a player who plays a game using the game device installed in the game operating entity from the server system and transmitting the user data to the game device before the player starts playing the game, the save process receiving game result data about the player obtained by the game device from the game device after the player has finished playing the game and writing the received game result data to the server system; and performing a charging process that charges the game operating entity for at least one of the reading from the server system during the load process and the writing to the server system during the save process, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

27. A control method that is implemented by a server system that is communicably connected to a game device that is installed in a game operating entity, the method comprising:

performing at least one of a load process and a save process, the load process reading user data about a player who plays a game using the game device installed in the game operating entity from the server system and transmitting the user data and charging session identification information that is linked to the user data to the game device before the player starts playing the game, the save process receiving the charging session identification information and game result data about the player obtained by the game device from the game device after the player has finished playing the game and writing the received game result data to the server system; and performing a charging process that charges the game operating entity using the received charging session identification information, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

28. A computer program product comprising a non-transitory computer-readable medium storing a program, the program causing a computer to:

perform at least one of a load process and a save process, the load process reading user data about a player who plays a game using a game device installed in a game operating entity from a server system and transmitting the user data to the game device before the player starts playing the game, the save process receiving game result data about the player obtained by the game device from the game device after the player has finished playing the game and writing the received game result data to the server system; and perform a charging process that charges the game operating entity for at least one of the reading from the server system during the load process and the writing to the server system during the save process, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

29. A computer program product comprising a non-transitory computer-readable medium storing a program, the program causing a computer to:

perform at least one of a load process and a save process, the load process reading user data about a player who plays a game using a game device installed in a game operating entity from a server system and transmitting the user data and charging session identification information that is linked to the user data to the game device before the player starts playing the game, the save process receiving the charging session identification information and game result data about the player obtained by the game device from the game device after the player has finished playing the game and writing the received game result data to the server system; and perform a charging process that charges the game operating entity using the received charging session identification information, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

30. A non-transitory computer-readable information storage medium storing a program that when executed by at least one processor performs the following processes:

at least one of a load process and a save process, the load process reading user data about a player who plays a game using a game device installed in a game operating entity from a server system and transmitting the user data to the game device before the player starts playing the game, the save process receiving game result data about the player obtained by the game device from the game device after the player has finished playing the game and writing the received game result data to the server system; and a charging process that charges the game operating entity for at least one of the reading from the server system during the load process and the writing to the server system during the save process, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

31. A non-transitory computer-readable information storage medium storing a program that when executed by at least one processor performs the following processes:

at least one of a load process and a save process, the load process reading user data about a player who plays a game using a game device installed in a game operating entity from a server system and transmitting the user data and charging session identification information that is linked to the user data to the game device before the player starts playing the game, the save process receiving the charging session identification information and game result data about the player obtained by the game device from the game device after the player has finished playing the game and writing the received game result data to the server system; and a charging process that charges the game operating entity using the received charging session identification information, wherein:

the user data comprises at least one of: a team ID, a team name, a grade ID, an experience value, a team emblem ID, a title ID, a player-versus-player win count, a player-versus-player loss count, a mobile member determination flag, and team points; and the game result data comprises at least one of: a game device ID, a game operating entity ID, a team ID, a character DBID, a player-versus-player win count, a player-versus-player loss count, a player-versus-ghost win count, a player-versus-ghost loss count, a player-versus-CPU win count, a player-versus-CPU loss count, a grade ID, an experience value, a play time, user points, team points, a player-versus-CPU clear time.

* * * * *